United States Patent
Takasaki et al.

[11] Patent Number: 6,160,613
[45] Date of Patent: Dec. 12, 2000

[54] CHARGING CONDITION CONTROL IN DISTANCE MEASURING MECHANISM

[75] Inventors: Minoru Takasaki, Yokohama; Yukihiro Matsumoto, Kawaguchi, both of Japan

[73] Assignee: Canon Kabushiki Kaisha, Tokyo, Japan

[21] Appl. No.: 09/240,847

[22] Filed: Feb. 1, 1999

[30] Foreign Application Priority Data

Jan. 30, 1998 [JP] Japan .................................. 10-018416
Jan. 30, 1998 [JP] Japan .................................. 10-019119

[51] Int. Cl.$^7$ ............................. G01C 3/00; G01C 5/00; G02B 21/00; G03B 13/00; G03B 3/10
[52] U.S. Cl. .................... 356/3.08; 250/201.8; 356/3.14; 396/96; 396/106; 396/121
[58] Field of Search .............................. 396/96, 106, 121, 396/128; 250/201.7, 201.8; 356/3.08, 3.14

[56] References Cited

U.S. PATENT DOCUMENTS

| | | | |
|---|---|---|---|
| 4,672,189 | 6/1987 | Tsunekawa et al. .................... | 250/201 |
| 5,808,726 | 9/1998 | Egawa et al. .......................... | 356/3.06 |
| 5,848,301 | 12/1998 | Nonaka ..................................... | 396/56 |
| 5,862,415 | 1/1999 | Matsumoto ............................... | 396/55 |
| 5,870,178 | 2/1999 | Egawa et al. .......................... | 356/3.03 |
| 5,963,308 | 10/1999 | Takasaki et al. ....................... | 356/3.01 |

FOREIGN PATENT DOCUMENTS

| | | |
|---|---|---|
| 5-22843 | 3/1993 | Japan . |
| 8-233571 | 9/1996 | Japan . |
| 9-229674 | 9/1997 | Japan . |
| 9-229675 | 9/1997 | Japan . |
| 9-229676 | 9/1997 | Japan . |
| 9-229681 | 9/1997 | Japan . |

*Primary Examiner*—Stephen C. Buczinski
*Attorney, Agent, or Firm*—Fitzpatrick, Cella, Harper & Scinto

[57] ABSTRACT

In a distance measuring apparatus which performs a distance measuring operation in an active mode and in a passive mode, time serially, on a basis of charging conditions determined for performing the distance measuring operation in one of the active mode or the passive mode, charging conditions to be used in the distance measuring operation in the other mode are determined.

43 Claims, 17 Drawing Sheets

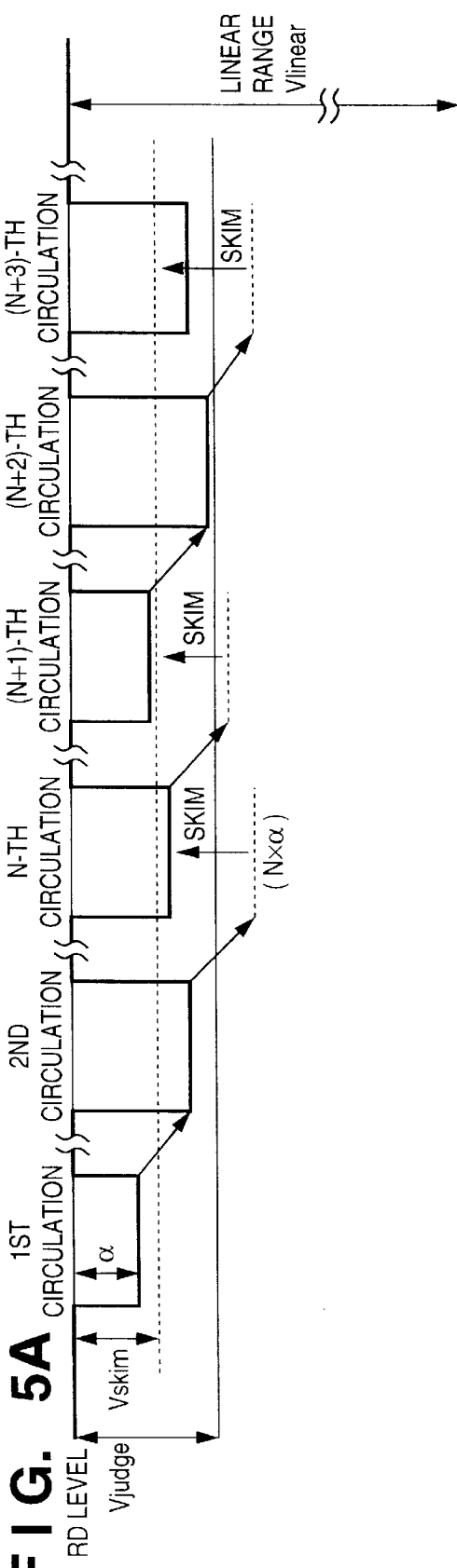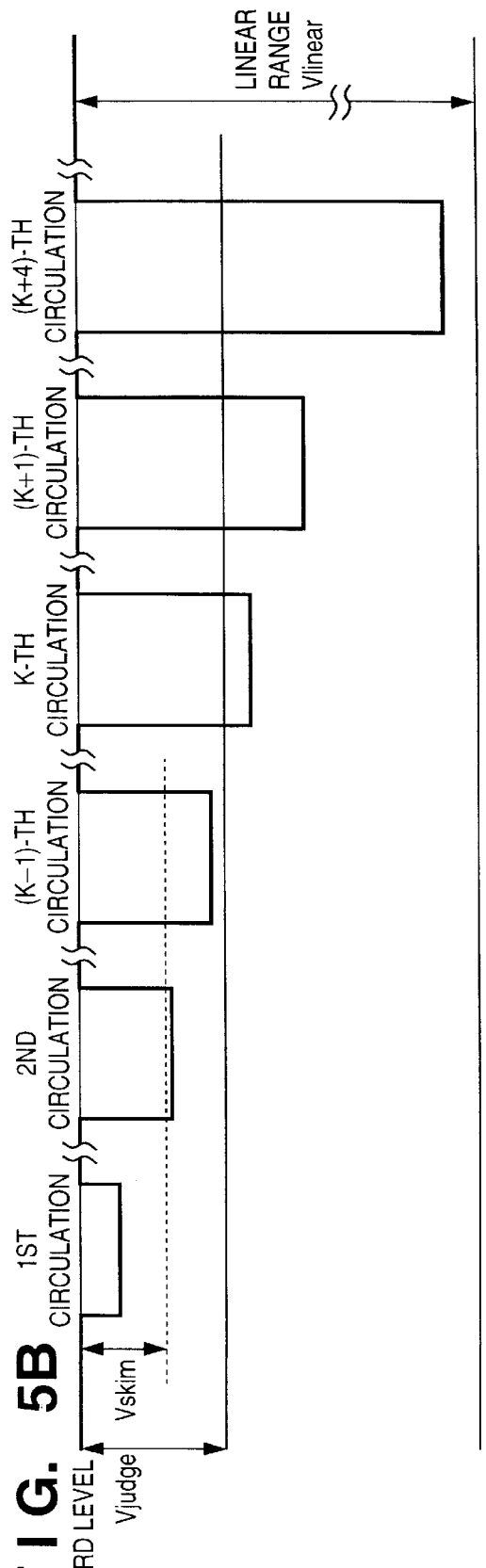

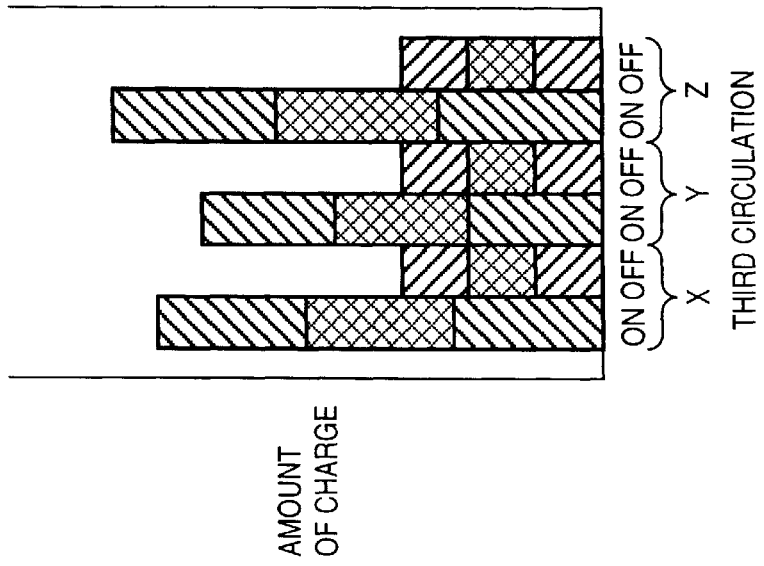
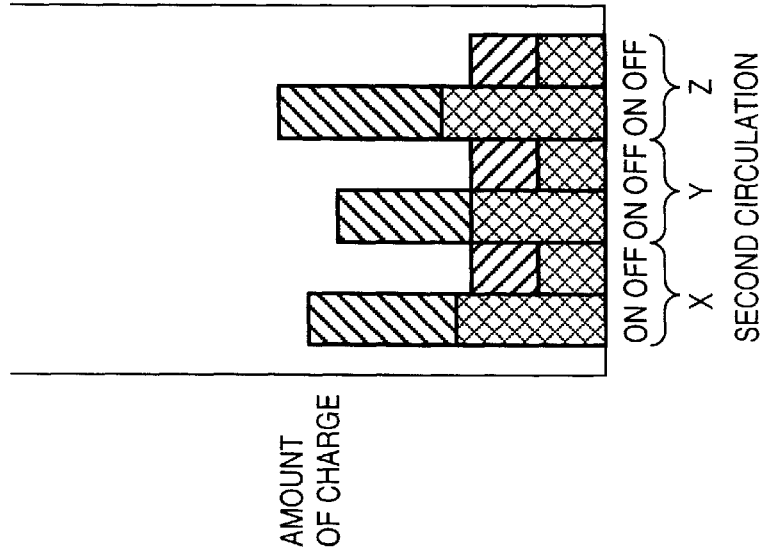
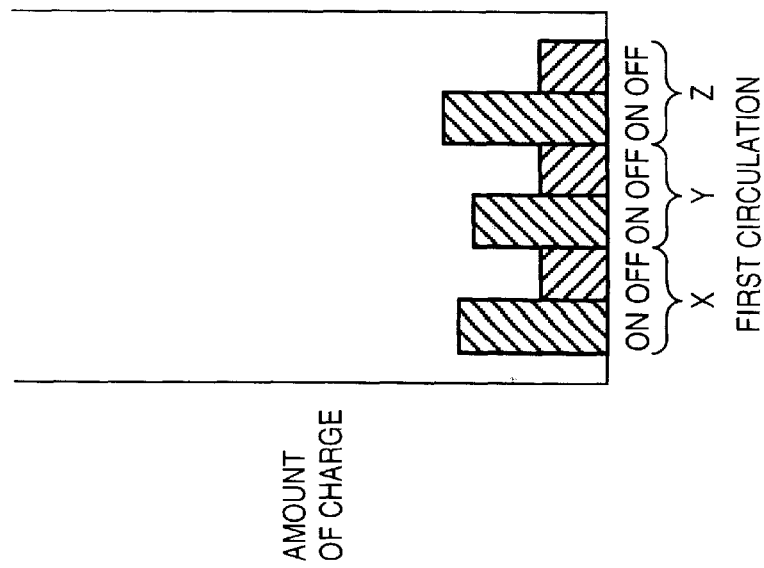

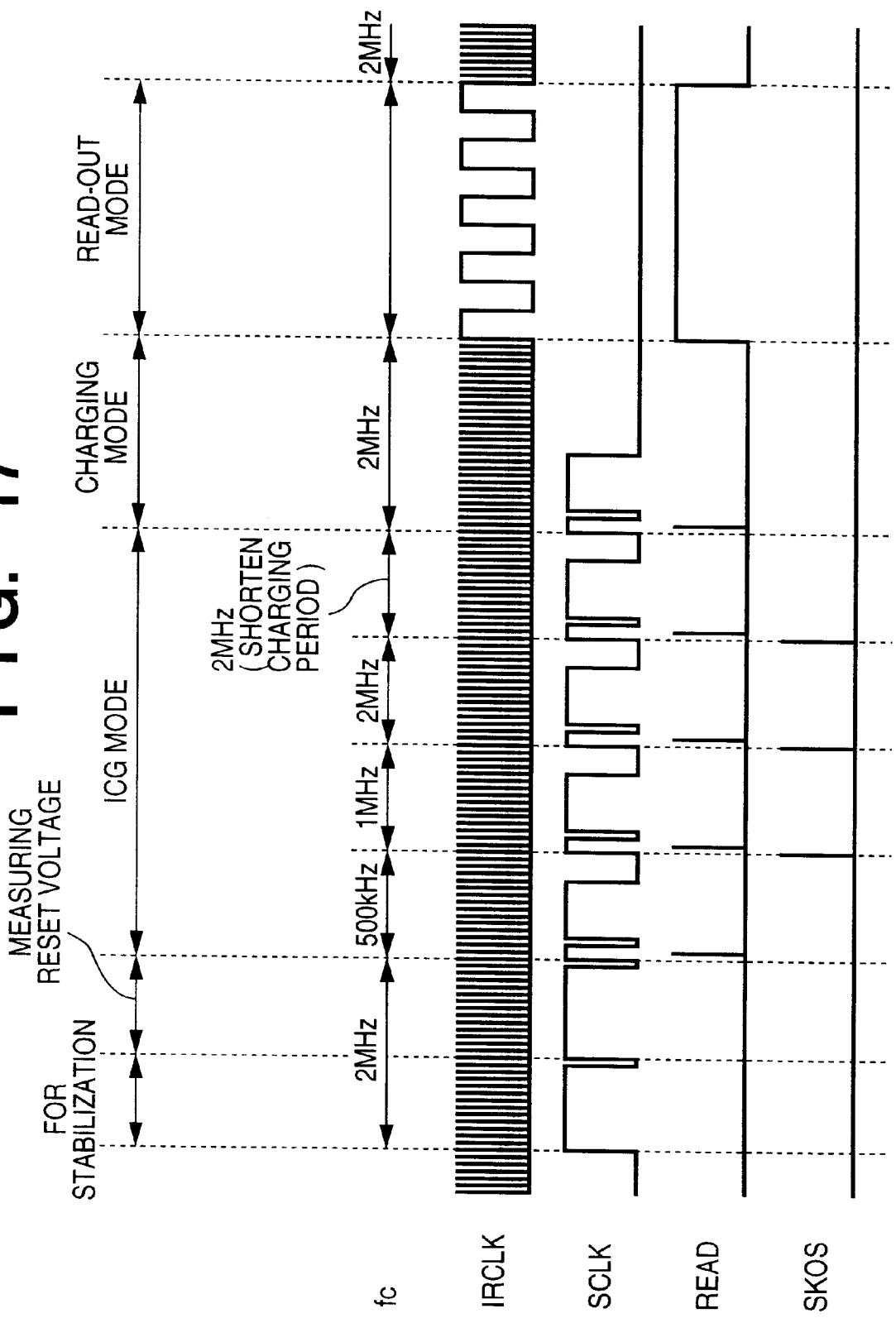

CHARGING CONDITION CONTROL IN DISTANCE MEASURING MECHANISM

BACKGROUND OF THE INVENTION

The present invention relates to charging condition control in a distance measuring apparatus for measuring the distance to an object and, more specifically, a method of controlling charging conditions suitably applied to an automatic focusing mechanism of a camera.

Conventionally, a distance measuring device which performs trigonometric calculation by projecting a light spot onto an object to be measured and receiving light reflected by the object using a position detection means such as a position sensitive detector (PSD) or the like is known. Further, another distance measuring device which circulates an accumulated charge using a ring-shaped charge transfer device, such as a CCD, to integrate reflected light of ON/OFF-projected light spots and skims a predetermined amount of charges of external light components other than the light spot has been proposed by Japanese Patent Publication No. 5-22843 and Japanese Patent Application Laid-Open No. 8-233571. The distance measuring device of this type can keep accumulating charges while circulating the accumulated charge if the level of the accumulated charge is not high enough, thereby it is possible to obtain signals of good S/N ratio.

FIG. 12 is a diagram illustrating a configuration of a light-receiving unit 500 used in a distance measuring apparatus.

Note, in FIG. 12, a photoelectric conversion (photo-receiving) device 520 of the light-receiving unit 500 is represented by three photoelectric conversion devices X, Y and Z, to simplify the explanation.

An image sensing apparatus having the light-receiving unit 500 operates in two different modes, namely, an active mode and a passive mode.

The active mode projects light onto an object 515 to be measured, the distance to which is to be measured, by turning on and off a light emit element (here, infrared light-emitting diode; IRED) 514 to emit light pulses, receives light reflected by the object 515, when the IRED 514 is on and when the IRED 514 is off, respectively, using the photoelectric conversion devices X, Y and Z, and stores the charges separately when the IRED 514 is on and when the IRED 514 is off. Whereas, the passive mode receives external light reflected by the object without turning on the IRED 514 using the photoelectric conversion devices X, Y and Z, and store the charges.

The distance measuring apparatus is of a hybrid-type capable of performing distance measuring operations both in the active mode and in the passive mode, and, when a reliable measurement result is not obtained in the active mode, then the distance is measured once again in the passive mode.

Further, the light-receiving unit 500 has a linear CCD 524 which includes ON-pixels 522x, 522y, and 522z and OFF-pixels 523x, 523y, and 523z, respectively corresponding to the photoelectric conversion devices X, Y and Z, a ring-shaped CCD 521 which includes a plurality of ON-pixels and OFF-pixels, and a skim CCD 523.

The charges obtained as a result of photoelectric conversion in the photoelectric conversion devices X, Y and Z are respectively transferred to the corresponding ON-pixels and OFF-pixels of the linear CCD 524 and stored. Thereafter, the charges are transferred to the ring-shaped CCD 521.

Next, timing of charge transfer operation in the light-receiving unit 500 is explained with reference to FIG. 13.

Referring to FIG. 13, the IRED 514 turns on and off in synchronization with the ON/OFF (High/Low) of a charging signal in the active mode, and the IRED 514 is kept off independent of the ON/OFF of the charging signal in the passive mode.

Below, the active mode is explained.

First, charges obtained in the photoelectric conversion devices X, Y and Z while the charging signal is ON (i.e., High level) are transferred to the ON-pixels 522x, 522y, and 522z while an ON-pixel transfer signal is ON (i.e., High level).

Further, charges obtained in the photoelectric conversion devices X, Y and Z while the charging signal is OFF (i.e., Low level) are transferred to the OFF-pixels 523x, 523y, and 523z while an OFF-pixel transfer signal is ON (i.e., High level).

In this manner, charges due to projected light reflected by the object and external light are stored in the ON-pixels 522x, 522y, and 522z, while charges due to external light are stored in the OFF-pixels 523x, 523y, and 523z in the active mode.

After the charges obtained in the photoelectric conversion devices X, Y and Z are transferred to the ON-pixels 522x, 522y, and 522z and the OFF-pixels 523x, 523y, and 523z, the charges are transferred to the ring-shaped CCD 521.

To transfer the charges to the ring-shaped CCD 521, a ring transfer signal is used. The ring transfer signal becomes High so that charges from the same pixel of the linear CCD 524 are always transferred to the same pixel of the ring-shaped CCD. Accordingly, charges outputted from the ON-pixel 522x, corresponding to the photoelectric conversion element X obtained during the charging signal is ON, for example, are accumulated.

In FIG. 13, the numerals 1, 2, 3, and so on, indicate the number of circulations. The number of circulations indicates the number of times charges are transferred to the ring-shaped CCD 521.

More specifically, in the first circulation, charges are transferred to the ring-shaped CCD 521 once, as shown in FIG. 14A, and the charges obtained in one charging operation are stored. In the second circulation, charges obtained in two charging operations are accumulated, as shown in FIG. 14B, and in the third circulation, charges are transferred to the ring-shaped CCD 521 three times; in other words, three charging operations are performed and charges obtained in the three charging operations are accumulated in the respective pixels, as shown in FIG. 14C.

When the charges accumulated in the ring-shaped CCD 521 do not reach a predetermined level (level in which distance measurement can be performed on the basis of the charges), i.e., incoming light to the photoelectric conversion devices X, Y and Z is low, the number of circulations, i.e., the number of charging operation, is increased, and the charges are sequentially transferred to the ring-shaped CCD 521 and accumulated until charges are accumulated to the necessary (predetermined) level. In this manner, it is possible to obtain charges of good S/N ratio.

Whereas, in a case where an amount of charge in the ring-shaped 521 exceeds a predetermined level within a predetermined number of circulations, i.e., in a case where incoming light to the photoelectric conversion devices X, Y and Z is high, it is necessary to adjust the amounts of charges to be stored in the pixels of the linear CCD 524 in one charging operation in order to prevent the pixels from being saturated.

As for adjusting the amount of charges, there are a method of adjusting a charging period by controlling an electrical shutter function, and a method for controlling a frequency for operating the photoelectric conversion devices X, Y and Z, thereby controlling a charging period.

More specifically, in the method of adjusting the charge amounts by controlling the electrical shutter function, if a reference charging period is 100%, then the charging period is reduced to 70%, 50%, and so on, when the object 515 is bright.

Further, in the method of adjusting the charge amount by controlling the frequency for operating the photoelectric conversion devices X, Y and Z, if any of the ON-pixels 522x, 522y, and 522z and the OFF-pixels 523x, 523y, and 523z is saturated when the photoelectric conversion devices X, Y and Z are operated at 1 MHz, then by operating the photoelectric conversion devices X, Y and Z in the doubled frequency, namely at 2 MHz, it is possible to halve the duration of the charging period without changing other charging conditions.

Further, means for changing the frequency for operating the linear CCD 524 and the ring-shaped CCD 521 depending upon the amount of external light in order to prevent the linear CCD 524 from being saturated is disclosed in the Japanese Patent Application Laid-Open No. 9-229676.

By adjusting the amount of charge as described above, the pixels of the linear CCD 524 are prevented from being saturated.

In such a hybrid-type distance measuring apparatus, a precise result of distance measurement is obtained since defects of the respective modes (active mode and passive mode) in the distance measuring operation are compensated by each other. The effects of a hybrid-type distance measuring apparatus are disclosed in the Japanese Patent Application Laid-Open No. 9-229674 by the present applicant, for instance. However, in this apparatus, since the distance measuring operations are performed both in the active mode and in the passive mode in time serially; therefore, it takes a longer time to perform the distance measuring operation comparing to a distance measuring operation performed in only one mode. Accordingly, a plurality of techniques for reducing time required for performing distance measuring operation in a hybrid-type distance measuring apparatus have been proposed. One of those techniques is disclosed in the Japanese Patent Application Laid-Open No. 9-229681 by the present applicant. According to the technique, in a case of performing a plurality of distance measuring operations consecutively, such as a case of performing a multi-point distance measuring operation, the frequency for operating a sensor and an open period of an electronic shutter set in the first operation are used in the subsequent distance measuring operations.

In a distance measuring apparatus mounted on a camera having a wide angle lens, for instance, a plurality of sensor arrays are arranged in the direction of the base line, as shown in FIG. 15, so as to measure distances to objects in a wide range by the respective sensor arrays.

FIG. 15 is a view for explaining the conventional technique as described above. In FIG. 15, reference numeral 50 denotes a light-receiving lens; and 51 to 53, sensor arrays for receiving light. In FIG. 15, a light-receiving unit of a distance measuring apparatus is mainly shown, and a light-emitting device is not shown. The sensor arrays 51 to 53 receive light incoming from the right, center, and left, respectively, via the light-receiving lens 50. Reference numeral 54 denotes a selector for selecting one of the outputs from the sensor arrays 51 to 53, which is composed of a switch; and 55, a signal processing unit for performing distance measuring calculation using the output of the sensor array selected by the selector 54.

As shown in FIG. 15, since the respective sensor arrays 51 to 53 receive light from different directions, the intensity of light received in the respective sensor array 51 to 53 may differ from each other. Thus, if the operational frequency of a sensor and an open period of an electronic shutter which are set for measuring a distance to an object 222 using the central sensor array 52, are used as charging conditions for measuring distance to an object 221 using the left sensor array 51, since light is very strong it may cause the sensor array 51 saturation. Accordingly, in the multi-point distance measuring apparatus which measures distances to objects in the multiple directions as described above, it is necessary to independently set the operational frequency of the sensor and the open period of the electronic shutter for measuring distances in the different directions, which requires a considerably long time for performing distance measuring operation.

Next, referring to FIG. 16, processes performed in integration clear gate (ICG) mode for determining charging conditions which do not cause saturation in the pixels of the linear CCD 524 by external light during a charge period are explained. Note, the ICG mode is performed by a not-shown controller, such as a CPU, while controlling the light-receiving unit 500.

First, when the ICG mode is initiated, the operation frequency of the linear CCD 524 and the ring-shaped CCD 521, fc, is set to the lowest value, namely, 500 kHz in step S702.

Next, a charging period is set to an initial value, i.e., the longest period. Since the charging period and other charging conditions in the linear CCD 524 can be changed by communicating with the controller (not shown) as described above, the controller generates communication data indicative of the initial value which makes the charging period longest, and sends the data to the light-receiving unit 500, thereby the charging period is set to the initial value in step S703.

Thereafter, the linear CCD 524 and the ring-shaped CCD 521 are cleared in step S704, then charging processing is initiated in step S705.

At the same time, the controller monitors a signal SKOS outputted from the light-receiving unit 500. The signal SKOS has a characteristic of changing its signal level (high and low) when the level of charges integrated in the ring-shaped CCD 521 exceeds a predetermined level during integrating charges in the ICG mode. The predetermined level is set on the basis of a value obtained by multiplying the capacitance of each pixel of the linear CCD 524 by a desired number. Therefore, by monitoring time since the charging processing is initiated until the level of the signal SKOS changes, it is possible to determine whether or not the current charging conditions are proper.

Next in step S706, whether or not the level of the signal SKOS has changed is checked. If the level is not changed, then the process proceeds to step S707 where whether or not the number of circulations exceeds the maximum number of circulations, which is set in advance, is determined. If it does, then the integration of charge is terminated at that point, and the process is completed. Whereas it is does not, then the process returns to step S706 where the processes of the subsequent steps are performed.

Whereas, if it is determined in step S706 that the level of the signal SKOS has changed, then whether or not the number of the circulations is equal to or less than a predetermined number of circulations (in FIG. 16, four), in other words, whether or not time elapsed before the level of the signal SKOS has changed is within a predetermined period, is determined in step S709. If the number of circulations exceeds the predetermined number, then the process is completed.

Note that the number of circulations is counted by counting a clock IRCLK which will be explained later.

Whereas, if it is determined in step S709 that the number of circulations is equal to or less than the predetermined number, namely, equal to or less than four, then the process proceeds to step S710 where whether the set operation frequency fc is the maximum frequency or not is determined.

If it is determined that the operation frequency fc is the maximum, then in step S711, whether or not the charging period which is currently set is the shortest is determined. If it is determined in step S711 that the charging period is the shortest, then the process is completed. Whereas, if it is not, the charging period is changed to a shorter period in step S712, then the process returns to step S703, and the subsequent steps are repeated. By changing the charging period to a shorter period, the changing condition that changed so that the level of the signal SKOS does not change within the predetermined number of circulations.

Further, if it is determined in step S710 that the operation frequency fc is not the maximum, the operation frequency fc is changed to a higher frequency in step S713, then the process returns to step S703 and the subsequent processes are repeated.

After the ICG mode as described above is completed, the charging (integration) mode for integrating charges in the ring-shaped CCD 521 is performed, then the reading mode for outputting the charges integrated in the ring-shaped CCD 521 to a microcomputer, for example, is performed.

Then, the microcomputer performs operations for calculating the distance to the object 515 on the basis of the outputted charges.

FIG. 17 shows waveforms of signals when the operation frequency fc is changed from the lowest to the highest, further, the charging period is shortened by a predetermined period, in the ICG mode.

In FIG. 17, the signal IRCLK is a reference clock for changing the charging conditions, and the IRED 514 turns on and off in synchronization with the signal IRCLK. Further, the signal IRCLK is also used for counting the number of circulations.

Further, the signal SKOS is outputted from the light-receiving unit 500, and, as described above, the level of the signal SKOS is changed in accordance with the set charging conditions.

When the ICG mode is initiated, 500 kHz is set as an initial frequency of the operation frequency fc. With 500 kHz, if the level of the signal SKOS has changed in a time equal to or less than four circulations (i.e., if the level of the signal SKOS has changed before the count of the signal IRCLK reaches five), the operation frequency fc is changed to a higher frequency (in this case, 1 MHz), then the ICG mode is repeated.

Next, with the operation frequency fc of 1 MHz, if the level of the signal SKOS has changed before the count of the signal IRCLK reaches five, the operation frequency fc (1 MHz) is changed to a higher frequency (2 MHz), then the ICG mode is repeated.

Thereafter, with the operation frequency fc of 2 MHz, if the level of the signal SKOS has changed before the count of the signal IRCLK reaches five, since it is not possible to change the operation frequency fc to a higher frequency, because 2 MHz is the maximum frequency, the charging period is shortened, and the ICG mode is repeated. Under the above conditions, the level of the signal SKOS does not change when the count of the signal IRCLK reaches four, in the example shown in FIG. 17. Accordingly, the ICG mode is completed, and the process moves to the charging mode.

In the above operation, it is necessary to drive the CCDs at a predetermined frequency while accumulating charges in the linear CCD 524 and the ring-shaped CCD 521 and while executing the ICG mode for determining the charging conditions. Whereas, it is not necessary to drive the CCDs at the predetermined frequency while communicating with the controller and clearing residual charges in the CCDs, for instance, and any frequency may be used as long as the CCDs are not improperly operated.

However, as described above, the operation frequency fc when communicating with the controller and clearing residual charges in the CCDs are the same as the operation frequency fc when accumulating charges in the CCDs and executing the ICG mode for determining the charging conditions.

More specifically, in the example as shown in FIGS. 16 and 17, in the first execution of the ICG mode, the communication and the clearing of the CCDs in step S703 and S704 are performed at the operation frequency fc of 500 kHz, thereafter, charging operation is performed at the same driving frequency fc, i.e., 500 kHz, in the steps subsequent to step S705. In the next execution of the ICG mode, the communication and the clearing of the CCDs in step S703 and S704 are performed at the operation frequency fc of 1 MHz, thereafter, charging operation is performed at the same operation frequency fc of 1 MHz in the steps subsequent to step S705. In the next execution of the ICG mode, the communication and the clearing of the CCDs in step S703 and S704 are performed at the operation frequency fc of 2 MHz, thereafter, charging operation is performed at the same operation frequency fc of 2 MHz in the steps subsequent to step S705.

Therefore, when a driving frequency is set to a low frequency for driving a sensor to accumulate charges or to determine charging conditions, for instance, communication with a controller, such as a microprocessor, and clearing of residual charges in the sensor are conventionally performed at the same low frequency. Therefore, compared to a case where the operation frequency is set to a high frequency, it takes a longer time to communicate with the controller and clear charges in the sensor, which causes low throughput.

SUMMARY OF THE INVENTION

The present invention has been made in consideration of the above situation, and has as its object shortening throughput of a distance measuring operation by reducing time for determining charging conditions.

According to the present invention, the foregoing object is attained by providing a distance measuring apparatus comprising: a light-emitting device for projecting light pulses onto an object for which a distance is to be measured; a pair of light-receiving units each having a plurality of photoelectric conversion elements which receives light reflected by the object, generates charges in correspondence with the received light, and outputs the charges; a controller for controlling to perform a distance measuring operation in a first mode and in a second mode time serially; a first condition determination unit for determining charging conditions to be used in the first mode in accordance with the charges outputted from the pair of light-receiving units; and a second condition determination unit for determining charging conditions to be used in the second mode on the basis of the charging conditions determined by the first condition determination unit.

According to the present invention, the foregoing object is also attained by providing a control method of controlling a distance measuring apparatus, comprising: a light projecting step of projecting light pulses onto an object for which a distance is to be measured; a photoelectric conversion step of receiving light reflected by the object, generating charges in correspondence with the received light, and outputting the charges using a pair of light-receiving units each having a plurality of photoelectric conversion elements; a first condition determination step of determining charging conditions to be used in a first mode in accordance with the charges outputted in the photoelectric conversion step; a second condition determination step of determining charging conditions to be used in a second mode on the basis of the charging conditions determined by the first condition determination step; and a control step of controlling to perform a distance measuring operation in the first mode and in the second mode time serially.

According to the present invention, the foregoing object is also attained by providing an optical device used for measuring a distance to an object, comprising: a light-emitting device for projecting light pulses onto an object for which a distance is to be measured; a pair of light-receiving units each having a plurality of photoelectric conversion elements which receive light reflected by the object, generate charges in correspondence with the received light, and output the charges; a pair of charge accumulation units for accumulating charges outputted from the respective photoelectric conversion elements of the pair of light-receiving receiving units; and an operation frequency controller for independently controlling a first operation frequency used in a first period when charges are accumulated in the charge accumulation units and a second operation frequency used in a second period other than the first period.

According to the present invention, the foregoing object is also attained by providing a control method of controlling an optical device used for measuring a distance to an object, the method comprising: a light projecting step of projecting light pulses onto an object for which a distance is to be measured; a photoelectric conversion step of receiving light reflected by the object, generating charges in correspondence with the received light, and outputting the charges using a pair of light-receiving units each having a plurality of photoelectric conversion elements; a charge accumulation step of accumulating the charges in the photoelectric conversion step; a first determination step of determining a first operation frequency used in a first period when charges are accumulated in the charge accumulation units; and a second determination step of determining a second operation frequency used in a second period other than the first period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B show transition of charges as they are integrated;

FIGS. 14A to 14C are graphs for explaining states of integrated charges in response to the number of circulations;

FIG. 17 is a timing chart of conventional driving pulses for the light-receiving unit in the ICG mode.

DETAILED DESCRIPTION OF THE PREFERRED EMBODIMENTS

Preferred embodiments of the present invention will be described in detail below in accordance with the accompanying drawings.

First Embodiment

Figure 1:
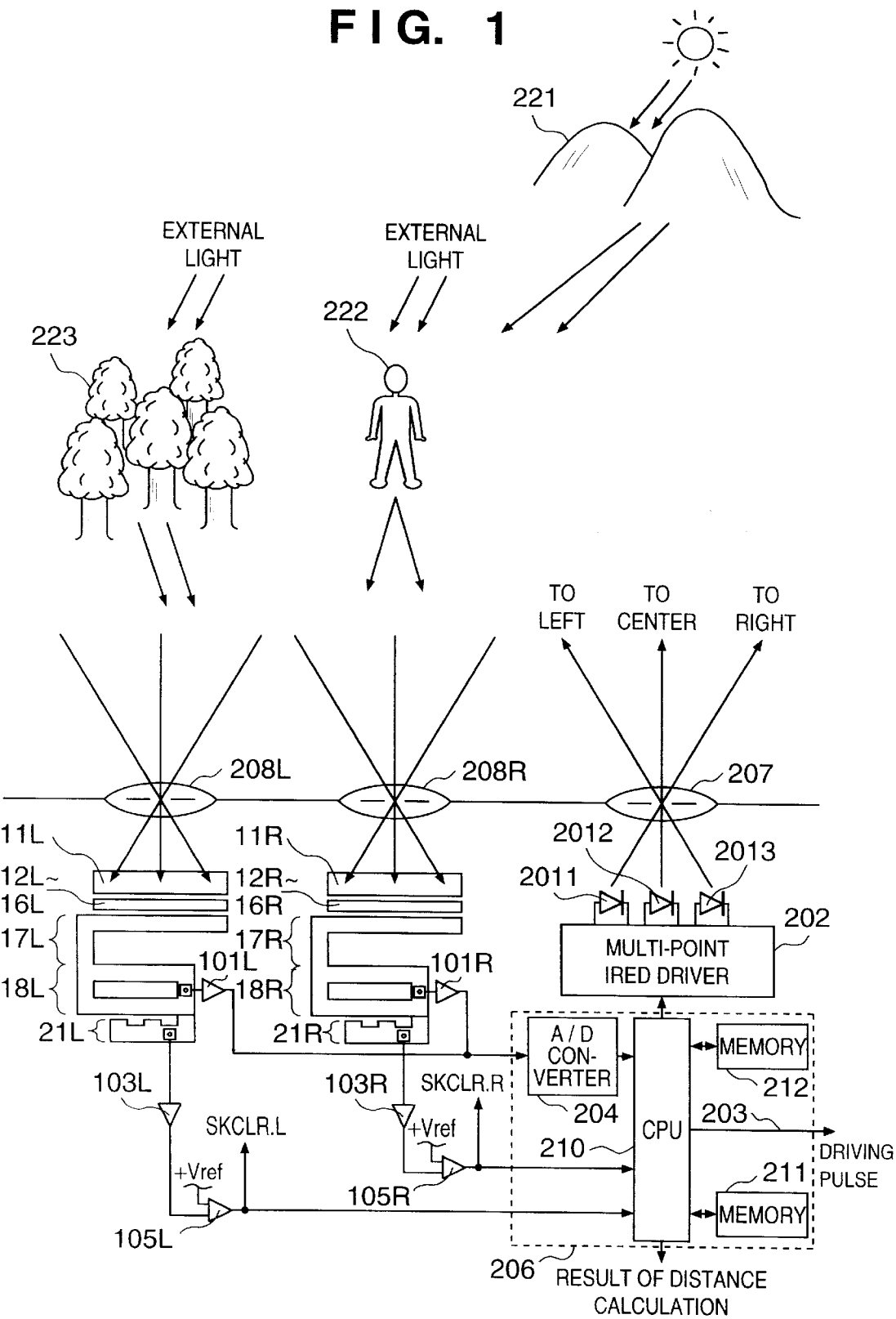
FIG. 1 is a view showing a hybrid-type distance measuring apparatus capable of performing distance measuring operations in an active mode and a passive mode according to a first embodiment of the present invention.

FIG. 1 is a diagram illustrating a hybrid-type distance measuring apparatus capable of performing distance measuring operations both in an active mode and in a passive mode, which includes a circulating-type shift register (ring-shaped CCD) which is composed of a plurality of CCDs, arranged in a ring-shape, having a skimming mechanism according to the first embodiment of the present invention.

In the first embodiment, multi-point distance measurement in which distance measuring operation is performed for a plurality of directions is available, further, distance measuring operations are sequentially performed in the active mode and in the passive mode.

Referring to FIG. 1, a light-emitting device having a light-emitting element 2011 (left), a light-emitting element 2012 (center), and a light-emitting element 2013 (right), such as IREDs, which repeatedly project light as light pulses onto objects 221, 222 and 223 to be measured in the respective directions, a projection lens 207 which collects light to make light flux, light-receiving lenses 208R and 208L for collecting light pulses, emitted by the light-emitting device and reflected by the objects 221, 222 and 223 in the active mode, and collecting external light reflected by the objects 221, 222 and 223 in the passive mode without emitting light from the light-emitting device, and a pair of sensor arrays 11R and 11L for receiving the collected light are provided. The sensor arrays 11R and 11L are configured with a large number of photoelectric conversion elements arranged in the direction of the base line so that distances to the three objects 221, 222 and 223 in the three different directions can be measured.

Reference numerals 12R to 16R, and 12L to 16L denote accumulation units and transfer units for accumulating and transferring charges from the respective photoelectric conversion elements via electronic shutters. Details of the accumulation units and the transfer units 12R to 16R and 12L to 16L are explained later in detail with reference to FIG. 2. Reference numerals 17R and 17L denote linear CCDs as charge input means, to which charges generated by the sensor arrays 11R and 11L and accumulated by the accumulation units are transferred, for inputting the transferred charges to ring-shaped CCDs 18R and 18L, configured with CCDs arranged in a ring shape so to circulate charges. Reference numerals 21R and 21L denote skim units for discharging a predetermined amount of charges in accordance with a predetermined condition; and 101R and 101L, OS amplifiers to which voltages, proportional to charges in charge transfer channels of the ring-shaped CCDs 18R and 18L and detected at floating gates provided on the charge transfer channels, are inputted.

Reference numerals 103R and 103L are amplifiers to which voltages, proportional to charges in charge transfer channels of the skim units 21R and 21L and detected at the floating gates provided on the charge transfer channels, are inputted. The output voltages from the amplifiers 103R and 103L are transferred to comparators 105R and 105L. The comparators 105R and 105L respectively compare voltages outputted from the amplifiers 103R and 103L to a reference voltage Vref, thereby checking amounts of charges transferred to the charge transfer channels of the skim units. If the output voltages are greater than the predetermined voltage, then signals SKCLR.R and SKCLR.L, for initiating a skimming operation, are outputted. These signals SKCLR.R and SKCLR.L are applied to the skim units 21R and 21L, in turn, the skimming operation is performed. Further, the signals SKCLR.R and SKCLR.L are also inputted to an automatic focusing (AF) controller 206.

Further, reference numeral 204 denotes an analog-digital (A/D) converter for performing analog-to-digital conversion on the output voltages from the OS amplifiers 101R and 101L. The converted digital data is transmitted to a CPU 210. Reference numeral 206 denotes the AF controller for controlling the overall operation of the distance measuring apparatus, which includes the A/D converter 204, the CPU 210, and memory 211 and 212. The AF controller 206 receives voltages, corresponding to charges in the ring-shaped CCDs 18R and 18L, outputted from the OS amplifiers 101R and 101L, and the signals SKCLR.R and SKCLR.L for initiating a skimming operation, then outputs a driving signal for a multi-point IRED driver 202 for driving the light-emitting device, driving pulses 203 for controlling operation of respective circuits, such as the sensor arrays 11R and 11L as photo-receiving devices, and the amplifiers, and a result of distance calculation to an external device (not shown).

Figure 4:
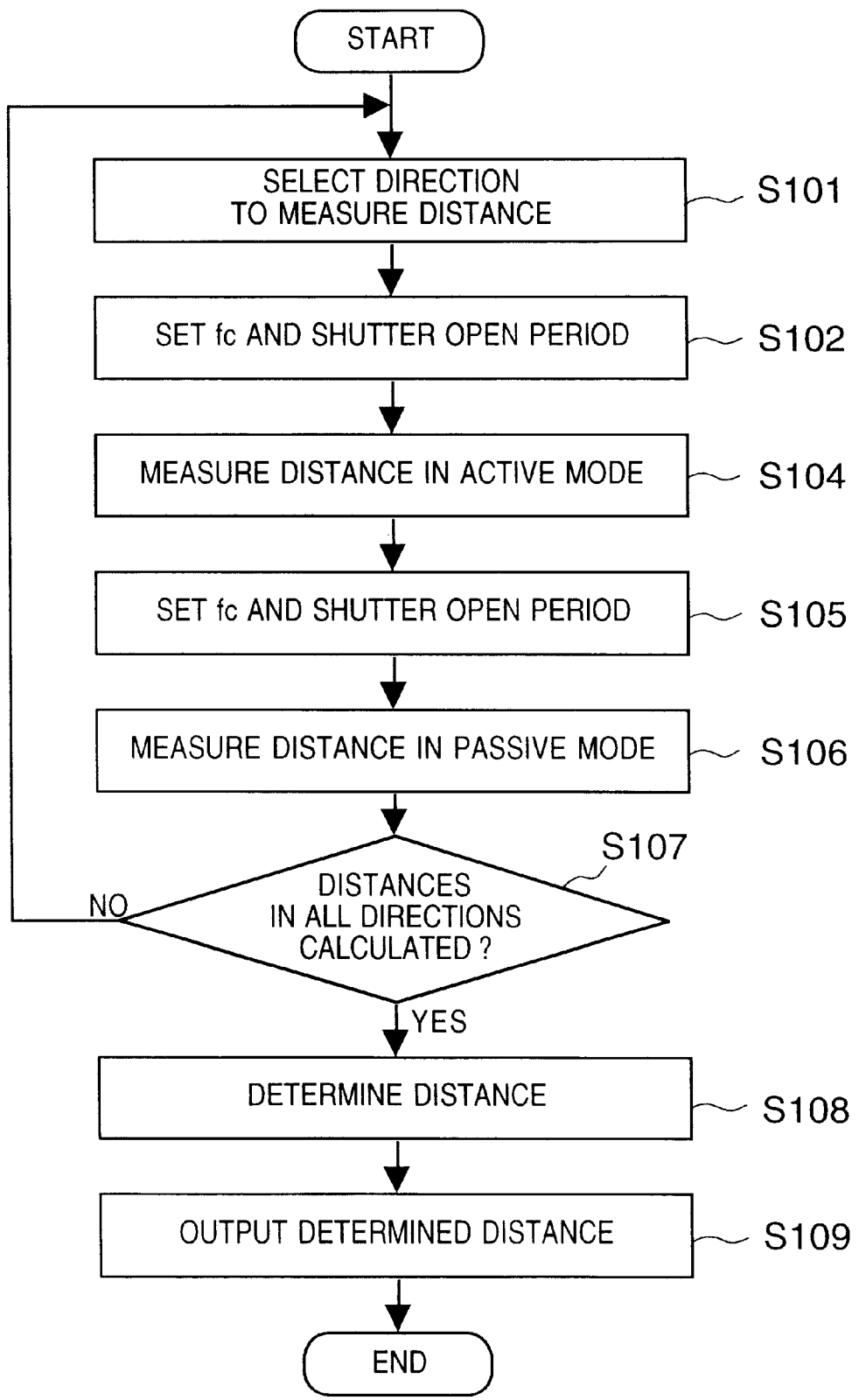
FIG. 4 is a flowchart for explaining an operation of the distance measuring apparatus according to the first embodiment of the present invention.

The CPU 210, which performs various calculations and control, operates the distance measuring apparatus in a sequence designated by a control software, including processings shown in a flowchart in FIGS. 4 and 6, which will be explained later, written in the memory 212, such as mask ROM and non-volatile memory. The memory 211 is used for temporarily storing data, for instance, while the CPU 210 performs processes. Note, the memory 212 configures the storage medium of the present invention, and it may be semiconductor memory, an optical disk, a magneto-optical disk, and a magnetic medium, for instance.

Figure 2:
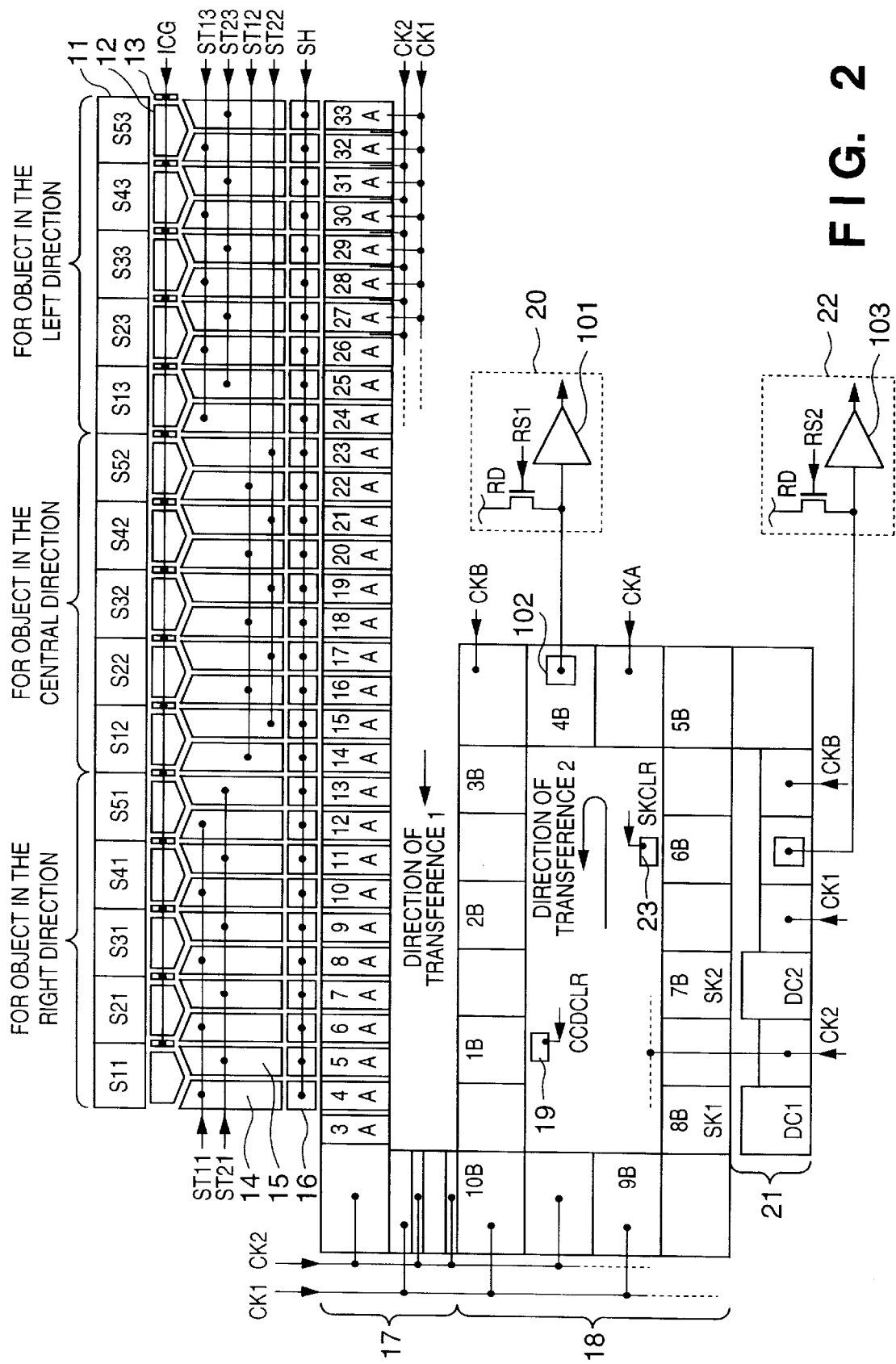
FIG. 2 is a view showing a configuration of a light-receiving unit used in the distance measuring apparatus shown in FIG. 1.

Next, distinctive operations of the units from the sensor arrays 11R and 11L to the amplifiers 101R and 101L, and 103R and 103L are explained with reference to FIG. 2. FIG. 2 is an enlarged view of a light-receiving unit of the distance measuring apparatus shown in FIG. 1. Note, in FIG. 1, the sensor arrays are denoted by 11R and 11L to distinguish the sensor array 11R arranged on the right from the sensor array 11L arranged on the left; however, the both sensor arrays have basically the same configuration, therefore, the letters R and L are omitted from the reference numerals in FIG. 2. A basic operation of the sensor array 11 is disclosed in the Japanese Patent Application Laid-Open No. 9-229675.

Figure 3:
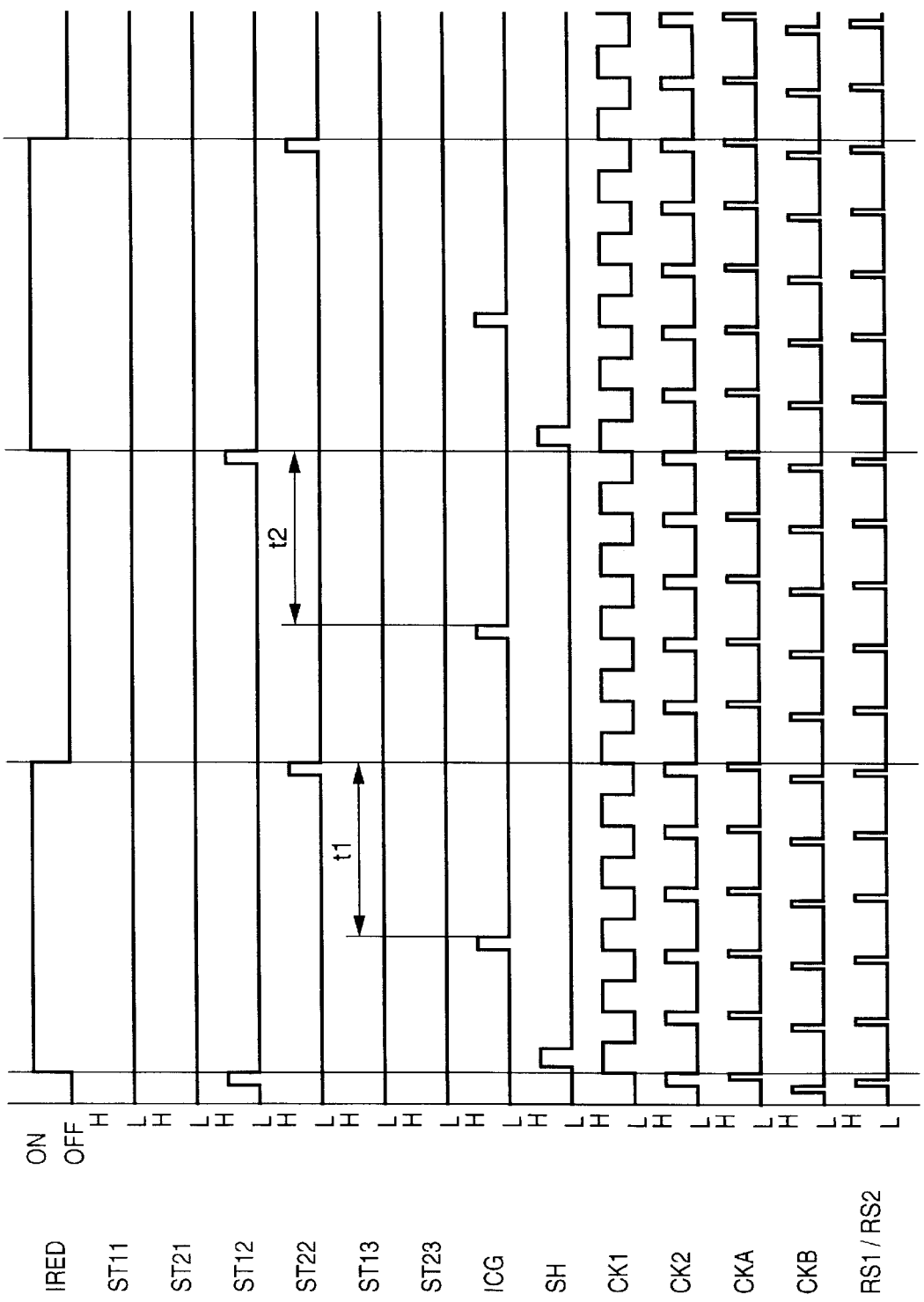
FIG. 3 is a timing chart of driving pulses for the light-receiving unit according to the first embodiment of the present invention.

FIG. 3 is a timing chart showing a part of the driving pulses 203 for operating the sensor array shown in FIG. 2.

In FIG. 2, charges obtained from the sensor array 11 are divisionally inputted to the ring-shaped CCD, thereby realizing a multi-point distance measuring operation in the three directions. The number of the directions is not limited to three, and charges are divided into an arbitrary number of groups in accordance with performance requested to the distance measuring apparatus. Left sensor elements S11, S21, S31, S41 and S51 (indicated as "S11 to S51" hereinafter) of the sensor array 11 are mainly for receiving light from an object on the right with respect to the center of the distance measuring apparatus via the light-receiving lens 208, and in the arrangement as shown in FIG. 1, the light reflected by the object 221 is converted into electric charges. Similarly, central sensor elements S12, S22, S32, S42 and S52 (indicated as "S12 to S52" hereinafter) are mainly for receiving light from an object near the center, and in the arrangement as shown in FIG. 1, the light reflected by the object 222 is converted into electric charges. Further, right sensor elements S13, S23, S33, S43 and S53 (indicated as "S13 to S53" hereinafter) are mainly for receiving light from an object on the left with respect to the center of the distance measuring apparatus, and in the arrangement as shown in FIG. 1, the light reflected by the object 223 is converted into electric charges.

The timing chart shown in FIG. 3 shows a case of reading out charges from the central censors S12 to S52. Transfer pulses ST11, ST21, ST13, and ST23 applied to a first accumulation unit 14 and a second accumulation unit 15 remain non-active (i.e., Low). Charges generated by the sensor elements S11 to S51 and S13 to S53 are collected in an accumulation unit 12 of FIG. 2; however, since transfer pulses remain Low, the accumulated charges are not transferred to the first accumulation unit 14 and the second accumulation unit 15. When an ICG pulse becomes active (High), the charges remaining in the accumulation unit 12 are discharged via an integration clear gate (electrical shutter) 13. In this case, therefore, charges generated by the central sensor elements S12 to S52 which are controlled by transfer pulses ST12 and ST22 that become active in this case, are transferred to the linear CCD 17 as the charge input means.

In a case of the active mode, the center light-emitting element (center IRED) 2012, shown in FIG. 1, is turned on and off so as to project near infrared light flux onto the object 222 in the center, and charges generated in the central sensor elements S12 to S52 while the center IRED 2012 is off are transferred to the first accumulation unit 14 when the transfer pulse ST12 is active, and charges generated in the central sensor elements S12 to S52 while the center IRED 2012 is on are transferred to the second accumulation unit 15 when the transfer pulse ST22 is active. The transferred charges are further transferred to the linear CCD 17 when a signal SH is active, then transferred in accordance with transfer clocks CK1 and CK2, finally inputted to the ring-shaped CCD 18. The ring-shaped CCD 18 circulates the charges to integrate them.

Similarly, in order to measure a distance to an object in the right direction, the right IRED 2011 is turned on and off, the transfer pulses ST11 and ST21 are controlled to become active at predetermined times so as to transfer charges generated in the left sensor elements S11 to S51 which receive light from the object 221 in the right direction while keeping the transfer pulses ST12, ST22, ST13, and ST23 non-active. Further, in order to measure a distance to an object in the left direction, the left IRED 2013 is turned on and off, the transfer pulses ST13 and ST23 are controlled to become active at predetermined times so as to transfer charges generated in the right sensor elements S13 to S53 which receive light from the object 223 in the left direction while keeping the transfer pulses ST12, ST22, ST12, and ST22 non-active.

In the passive mode, the IREDs 2011 to 2013 are kept off, and charges generated by the sensor elements corresponding to the respective directions of the objects are transferred to the ring-shaped CCD 18, where image signals of the objects are integrated.

As described above, the multi-point distance measuring operation can be realized by the hybrid-type distance measuring apparatus using ring-shaped CCDs.

Next, a sequence of measuring the distance to an object, according to the first embodiment, using the hybrid-type distance measuring apparatus having the aforesaid configuration will be explained below with reference to a flowchart shown in FIG. 4. In this embodiment, a distance measuring operation to measure distances to objects in three directions is performed time-serially, in the order of center, right, and left. However, the order can be arbitrarily changed. Further, the objects are considered as those shown in FIG. 1.

First in step S101, a direction subjected to the distance measuring operation in the multi-point distance measuring operation is selected. As described above, the center is selected, first, and the transfer pulses ST12 and ST22 become active so that charges generated by the sensor elements for mainly receiving light from the central direction are transferred to the ring-shaped CCD 18.

In step S102, an operation frequency, fc, for operating the linear CCD 17 and the ring-shaped CCD 18 and an open period of the electronic shutter 13, $t_1$ and $t_2$ in FIG. 3, are set so that the transfer elements of the light-receiving unit, especially the ring-shaped CCD 18 where charges are integrated, are not saturated due to brightness of light coming from the selected direction. Since the purpose of step S102 is to prevent the ring-shaped CCD 18 and the CCDs as the charge transfer devices from being saturated, the operation frequency fc and the open period are determined on the basis of output of the sensor element, which received the brightest light, among the sensor elements receiving light from the direction selected in step S101. When the objects are as those shown in FIG. 1, the light coming from the right direction should be very bright comparing to the light coming from the central direction since the sun is at the right; whereas, the light coming from the left direction should be dark since there are thick woods in the left direction.

Next in step S104, the distance measuring operation is performed in the active mode with the charging conditions set as above, and the obtained result of the distance to the object is written in the memory 211 at a predetermined address.

In step S105, the operation frequency fc and an open period of the electronic shutter 13, $t_1$ and $t_2$ in FIG. 3, are set on the basis of a measured result of brightness of the direction subjected to the distance measuring operation so that the transfer elements of the light-receiving unit, especially the ring-shaped CCD 18 where charges are integrated, are not saturated in the passive mode. Note, in a case of using the same conditions as those set in step S102, step S105 may be omitted.

Next in step S106, the distance measuring operation is performed in the passive mode with the charging conditions set as above, and the obtained result of the distance to the object is written in the memory 211 at a predetermined address.

In step S107, if the distances to the objects in all the directions have been calculated ("Yes" in step S107), then the process proceeds to step S108, whereas, if not, the process returns to step S101 and the distance measuring operation for the next direction is performed.

In step S108, on the basis of the results, written in the memory 211, obtained in both the active mode and the passive mode, the distance to the object is determined. Regarding specific method of determining a distance, since many methods have been proposed, explanation of them are omitted.

In step S109, the distance determined in step S108 is outputted to an external device (not shown), for instance.

Next, the processes performed in steps S102 and S105, which are characteristics of the first embodiment of the present invention, will be explained more specifically with reference to FIGS. 5A and 5B. FIG. 5A schematically shows output signals, which appear as the output of the OS amplifier 22 shown in FIG. 2 from one sensor element of the sensor array 11 when the light-emitting device is off in the active mode, and how the output due to external light changes when integrating charges from the sensor element. In FIGS. 5A and 5B, Vjudge is a skim judge level, and when the comparator 105R or 105L shown in FIG. 1 judges that the signal level due to external light exceeds Vjudge, the skimming operation is initiated. The skim judge level Vjudge is arbitrarily determined as a value +Vref. Vskim is a skim level, and an amount of charge corresponding to the skim level Vskim is discharged by a skim clear unit 23 shown in FIG. 2. The amount of charge to be discharged is determined by the structure of a skim unit 21 shown in FIG. 2.

Further, assume α is an amount of accumulated charge per accumulation operation (one circulation), and integrated in each circulation. In a case as shown in FIG. 5A, it is detected that the integrated charge due to external light exceeds the skim judge level Vjudge in the N-th circulation, and the skimming operation is performed. Note that α is proportional to the charging period if the intensity of light incident on the sensor element is steady; therefore, α is changed by altering the base frequency of operation pulses for operating the sensor array 11 and the accumulation units 12, 14 and 15 shown in FIG. 2. More specifically, by increasing the base frequency, i.e., the operation frequency fc, the frequency of each operation pulse which is obtained by dividing the operation frequency fc can be increased, and accordingly, the charging period is shortened and α is decreased. In opposite, by decreasing the operation frequency fc, α is increased.

Note that, as the operation frequency fc is increased, the duration of pulses, obtained by dividing the base frequency, for transferring charges becomes short, which may cause difficulties in charge transference. Generally, the upper limitation of the frequency of charge transfer pulses is several MHz. Accordingly, in order to make a smaller width in the aforesaid limitation of the frequency of the charge transfer pulses, an open period of the electronic shutter is shortened.

For preventing the ring-shaped CCD 18 from being saturated in the active mode, it is necessary to satisfy the following condition (1), $$\text{Vskim} > \alpha \tag{1}$$

For the above purpose, it is necessary for each output, α, from every sensor element obtained when the light-emitting elements are off to satisfy the condition (1).

In the distance measuring apparatus as shown in FIG. 1, the AF controller 206 knows of the initiation of the skimming operation from the inversion of the signal levels output from the comparators 105R and 105L. Accordingly, the AF controller 206 sets a charging period on the basis of the circulation number, N, when the skimming operation is initiated for the first time, so as to satisfy the following condition (2), based on the condition Vjudge>α×(N−1) which should be satisfied, $$\text{Vskim} > \text{Vjudge}/(N-1) > \alpha \tag{2}$$

In practice, the charging period is set to the longest period at first and N is obtained, then, if N does not satisfy the condition (2), the charging period is shortened by a predetermined period, and N is counted again. These processes are repeated until the condition (2) is satisfied, and a charging period which does not cause saturation in the ring-shaped CCD 18 is obtained. In this manner, brightness in the direction subjected to the distance measuring operation is measured, and the operation frequency fc and the open period of the electronic shutter are set in step S102.

FIG. 5B schematically shows output signals, which appear as the output of the OS amplifier 20 shown in FIG. 2 from one sensor element of the sensor array 11 in the passive mode, and how the output due to external light changes when integrating charges from the sensor element. In the passive mode, light emission by the light-emitting devices and a skimming operation are not performed, and integration of charges outputted from the sensor element is repeated until the integrated charge due to external light incidenting on the sensor element reaches the skim judge level Vjudge. In a case as shown in FIG. 5B, the integrated charge exceeds the level Vjudge in the K-th circulation, and transference of new charges from the sensor element is stopped. Note, however, in a case of integrating charges generated by the right sensor elements S13 to S53, it takes four more circulations for completely transferring charges in the first and second accumulation units 14 and 15, and the linear CCD 17 to the ring-shaped CCD 18, thus charges are integrated and glow until the (K+4)-th circulation is completed in the ring-shaped CCD 18.

At the same time, the integrated charges should be less than a level, Vlinear, to which linearity of the ring-shaped CCD 18 and the OS amplifier 101 is secured. For this purpose, it is necessary to control the amount of accumulated charge in each charging period in the passive mode differently from the active mode, and the amount of accumulated charge β is controlled so that the following condition (3) is satisfied.

$$(\text{Vlinear} - \text{Vjudge})/4 > \beta \tag{3}$$

However, if Vlinear is large enough to satisfy (Vlinear−Vjudge)/4 ≧ Vskim, then the following condition (4), $$(\text{Vlinear} - \text{Vjudge})/4 \geq \text{Vskim} > \text{Vjudge}/(N-1) > \alpha \tag{4}$$

is derived in accordance with the condition (2).

According to the condition (4), by applying the amount of charge α accumulated in one charging period, which is set in accordance with the condition (2) in the active mode, to β, namely by setting α=β, the condition (3) is satisfied and the output signal is kept lower than the level Vlinear, and saturation does not occur. In short, it is possible to use the operation frequency fc and the open period of the electronic shutter, which are set in the active mode, in the passive mode, too, and it becomes unnecessary to newly determine the operation frequency and the open period for the passive mode, which saves time for obtaining the operation frequency fc and the open period, thereby shortening throughput of the distance measuring operation.

Further, in a case where (Vlinear−Vjudge)/4 ≧ 2×Vskim is satisfied, then, $$(\text{Vlinear} - \text{Vjudge})/4 \geq 2 \times \text{Vskim} > 2 \times \text{Vjudge}/(N-1) > 2 \times \alpha \tag{5}$$

In this case, the operation frequency in the passive mode may be set to one half of the operation frequency fc set in the active mode, or the open period of the electronic shutter may be set to the value twice longer than the shutter open period set in the active mode. Since the values to be used in the passive mode can be obtained by performing simple calculation using the values set in the active mode, it is unnecessary, in the passive mode, to repeat the processes performed in the active mode to obtain the operation frequency fc and the shutter open period. Especially, when the shutter open period is set to twice longer than the shutter open period set in the active mode, the period required for integrating charges in the ring-shaped CCD 18 is roughly halved, which further shorten throughput of the distance measuring operation.

According to the first embodiment as described above, when a distance measuring operation is performed both in the active mode and in the passive mode time serially, since charging conditions in the passive mode are determined on the basis of charging conditions determined in the active mode, time for obtaining the charging conditions for the passive mode is omitted or shortened, thereby it is possible to shorten throughput of the distance measuring operation.

Second Embodiment

Next, the second embodiment will be explained. A distance measuring apparatus according to the second embodiment has the same configuration as that explained in the first embodiment with reference to FIGS. 1 and 2, thus, explanation of it is omitted.

Figure 6:
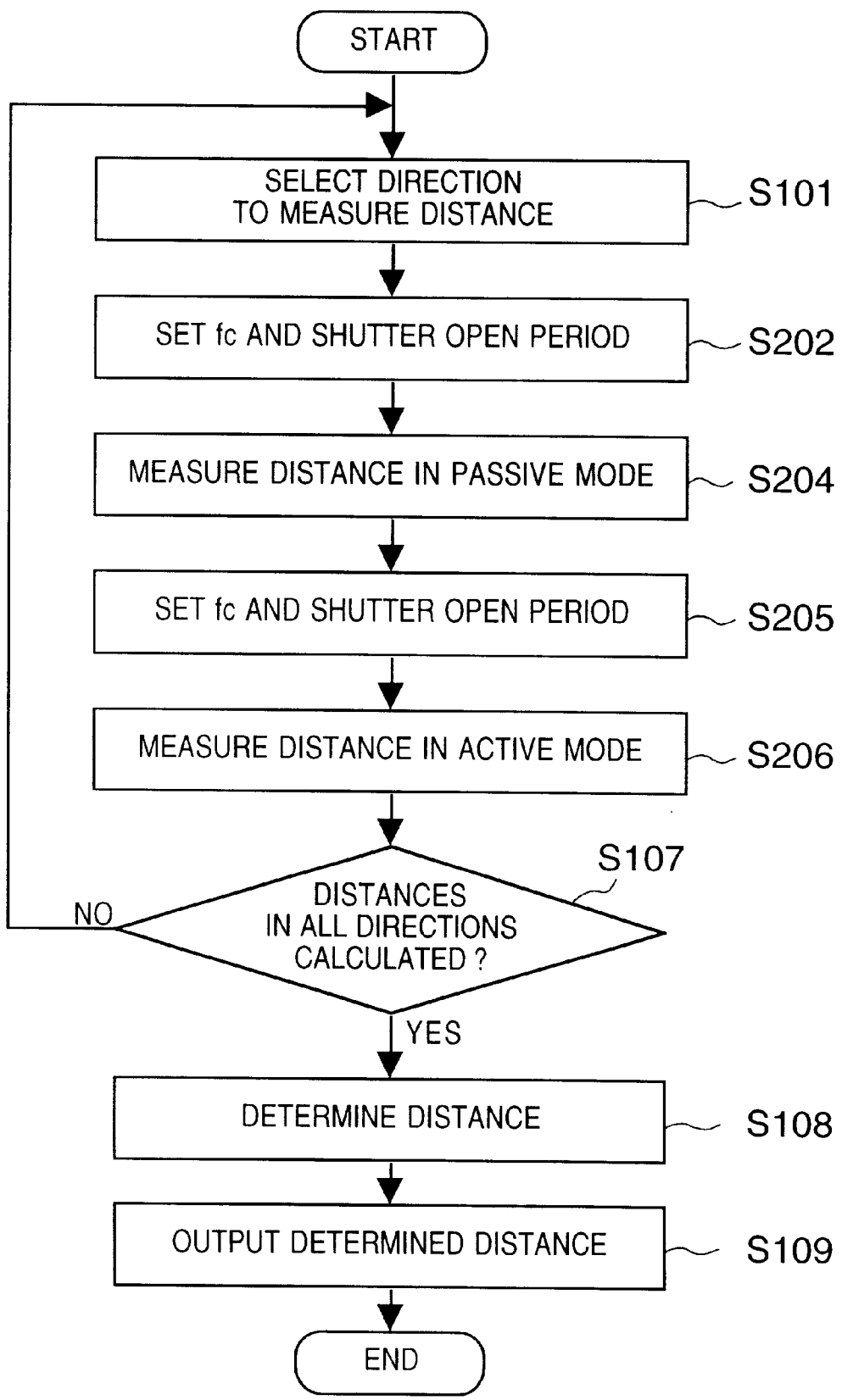
FIG. 6 is a flowchart for explaining an operation of the distance measuring apparatus according to a second embodiment of the present invention.

FIG. 6 is a flowchart showing a sequence of measuring a distance to an object, according to the second embodiment, using the hybrid-type distance measuring apparatus having the aforesaid configuration. In FIG. 6, the similar processes as those in FIG. 4 are referred to by the same step numbers, and steps different from FIG. 4 are explained.

In step S202, the operation frequency fc and an open period of the electronic shutter are set for the passive mode. Then in step S204, a distance measuring operation is performed in the passive mode under the conditions set in step S202. In step S205, the operation frequency fc and the shutter open period suitable for active mode are set on the basis of the conditions set in step S202. For instance, when (Vlinear−Vjudge)/4≧Vskim is satisfied, the operation frequency fc and the shutter open period obtained for the passive mode are used, as known from the condition (4), and, when (Vlinear−Vjudge)/4≧2×Vskim is satisfied, contrary to the first embodiment, an operation frequency twice higher than the operation frequency fc set for the passive mode or the shutter open period which is a half of the shutter open period set for the passive mode may be set as known from the equation (5). Thus, the values to be used in the active mode can be obtained by performing simple calculation on the basis of the values set for the passive mode, thereby time for obtaining the charging conditions for the active mode is omitted or shortened. Then in step S206, the distance measuring operation is performed in the active mode under the conditions set in step S205.

According to the second embodiment as described above, with the operation sequence which is similar to that of the first embodiment, it is unnecessary to repeat the processes to obtain the operation frequency and the shutter open period performed in the passive mode to newly obtain the operation frequency fc and the shutter open period for the active mode, thereby shortening throughput of distance measuring operation.

Third Embodiment

Next, the third embodiment of the present invention will be explained with reference to the accompanying drawings.

Figure 7:
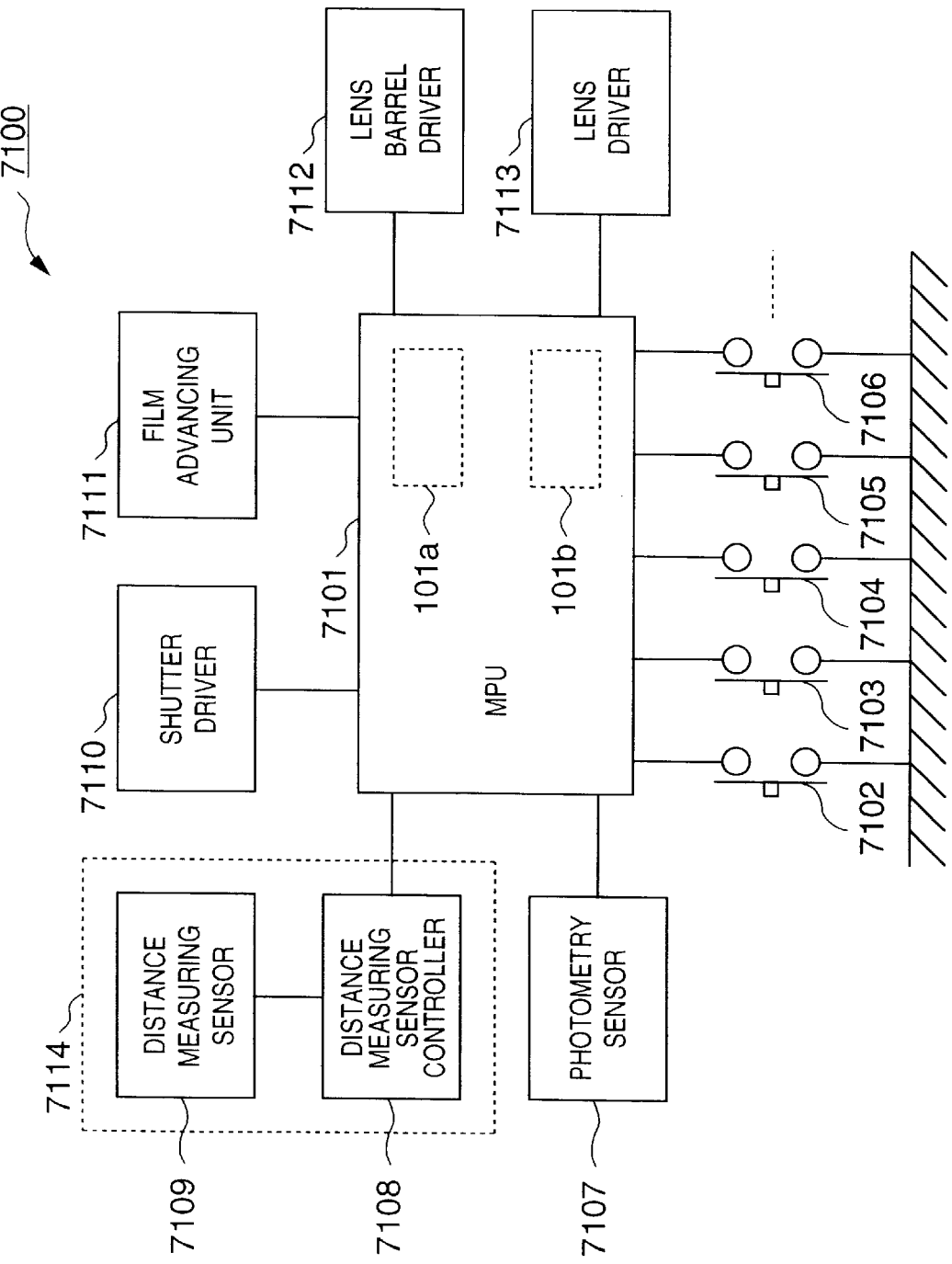
FIG. 7 is a block diagram illustrating a configuration of an image sensing apparatus to which a distance measuring apparatus of the present invention is applied according to a third embodiment of the present invention.

FIG. 7 is a block diagram illustrating a configuration of an image sensing apparatus 7100 to which a distance measuring apparatus of the present invention is applied.

The image sensing apparatus 7100 is a camera having an automatic focusing function, and as shown in FIG. 7, it comprises a microcomputer (MPU) 7101, switches 7102 to 7106 connected to the MPU 7101, a photometry sensor (ALS) 7107, a distance measuring unit 7114 including a distance measuring sensor controller (AFC) 7108 and a distance measuring sensor (AFS) 7109, a shutter driver (SHC) 7110, a film advancing unit (FM) 7111, a lens barrel driver (ZM) 7112, and a lens driver (LM) 7113.

The MPU 7101 includes memory 101a, having RAM and ROM where program and data for performing various operations are stored, and an operation unit 101b for performing various calculations. By down-loading a program stored in the memory 101a in advance and executing it, various processes, such as control of the overall operation depending upon outputs from each unit of the camera and operation performed in the operation unit 101b, are realized. As for the memory 101a, semiconductor memory, an optical disk, a magneto-optical disk, and a magnetic medium, for instance, may be used.

As for the switches 7102 to 7106, reference numeral 7102 denotes a main switch for turning on/off the camera; 7103, a tele-switch for moving a lens barrel (not shown) to a telephoto side when the camera is on; 7104, a wide-switch for moving the lens barrel to a wide-angle side when the camera is on; and 7105, a preparation switch for triggering preparation for image sensing operation when the camera is on. When the preparation switch 7105 is turned on, then the preparation for image sensing operation, such as photometry and distance measuring operation, is performed.

Reference numeral 7106 denotes the shutter switch. When the shutter switch 7106 is turned on while the preparation switch 7105 is on, it triggers a series of operation from focus control on the basis of the result of the distance measuring operation which will be explained later, through exposure of the film, then to an advancement of the film by a frame.

The on/off states of these switches 7102 to 7106 are provided to the MPU 7101.

The photometry sensor 7107, which includes a temperature sensor (not shown), measures external luminance for an image sensing operation and outputs a signal corresponding to the external luminance, measured by the temperature sensor, to the MPU 7101.

In the distance measuring circuit 7114, the distance measuring sensor 7109, which will be explained later in detail, includes circulating-type shift registers (ring-shaped CCDs) which operate in two modes, namely, the active mode and the passive mode, and is controlled by the distance measuring sensor controller 7108.

The shutter driver 7110 controls exposure time by a shutter (not shown) on the basis of an output from the photometry sensor 7107 (luminous quantity). The film advancing unit 7111 advances a film (not shown) a frame after exposing the frame, and the lens barrel driver 7112 moves the lens barrel for changing the focal length in response to on-operation of the tele-switch 7103 and the wide-switch 7104.

The lens driver 7113 moves the lens (not shown) for focusing on an object on the basis of the result of distance measuring operation obtained in the distance measuring circuit 7114.

Next, the distance measuring circuit 7114 of the image sensing apparatus 7100 having the aforesaid configuration is explained with reference to FIG. 8.

In this embodiment, a method of measuring a distance to an object 8202 on the basis of the principle of the trigonometry using a phase difference between outputs from two sensors (phase difference measuring method) is adopted.

Figure 8:
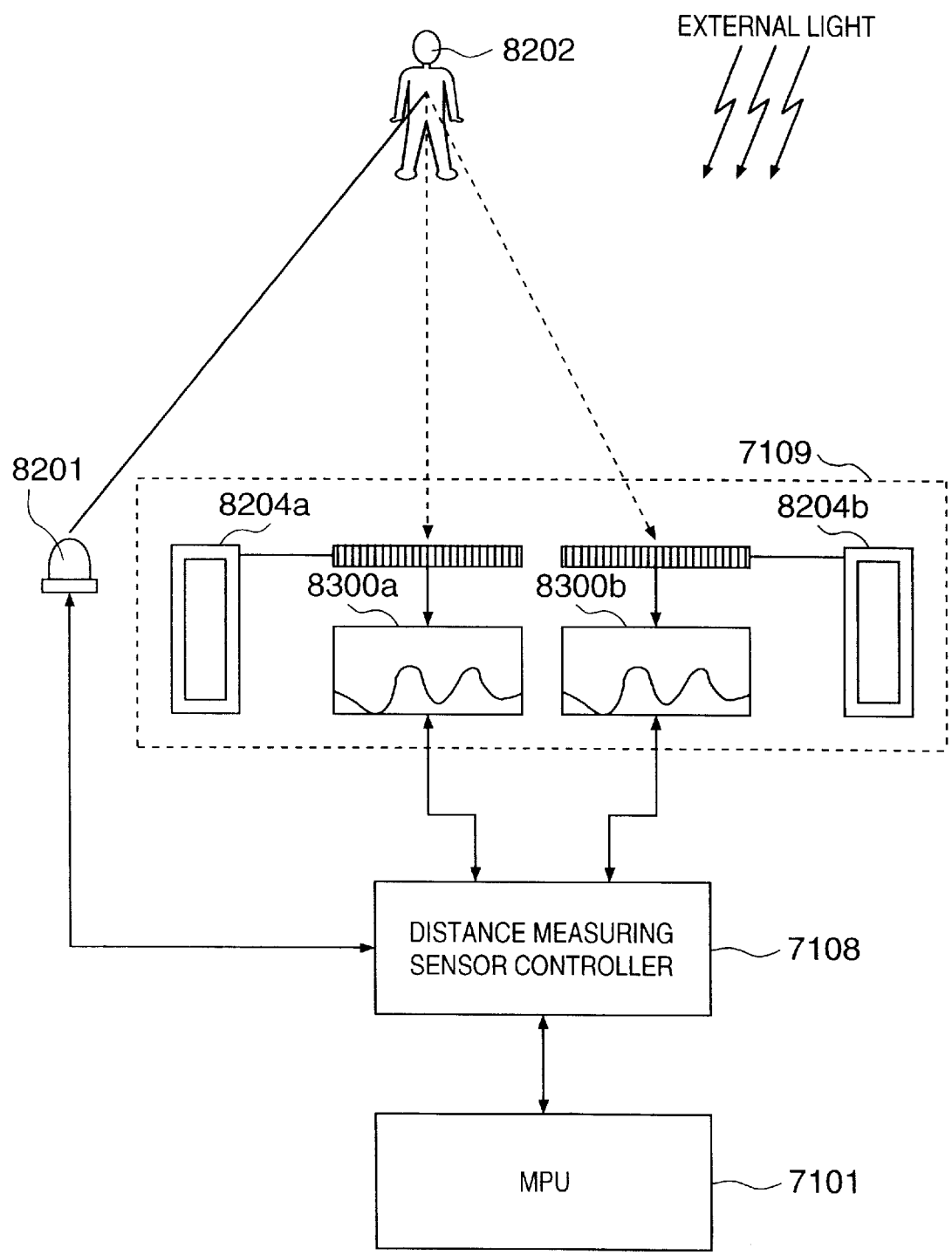
FIG. 8 is a diagram showing a concept of distance measurement and an internal configuration of a distance measuring circuit of the image sensing apparatus shown in FIG. 7.
Figure 12:
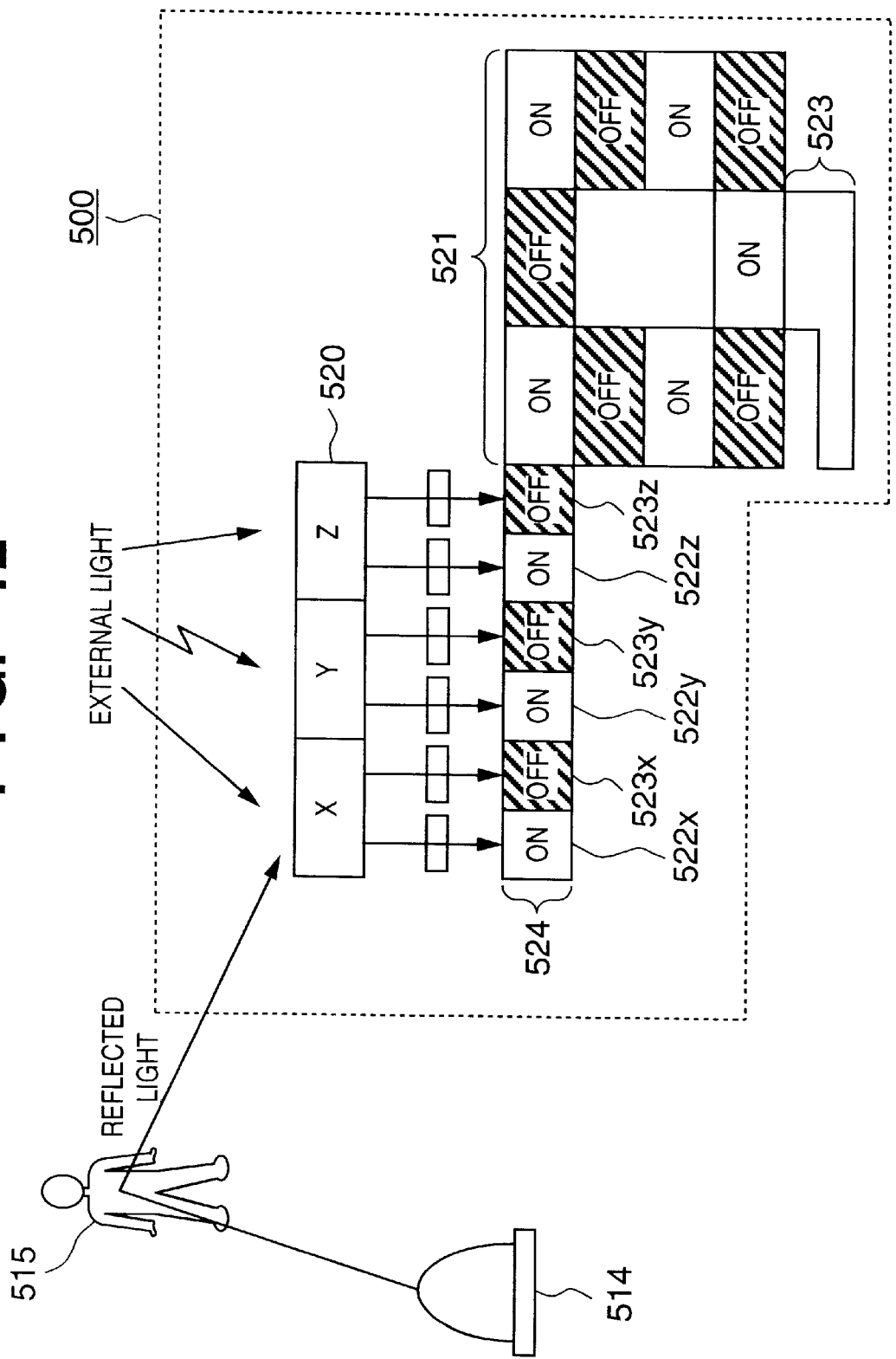
FIG. 12 is a diagram for explaining the principle of a circulating-type shift register (ring-shaped CCD)
Figure 13:
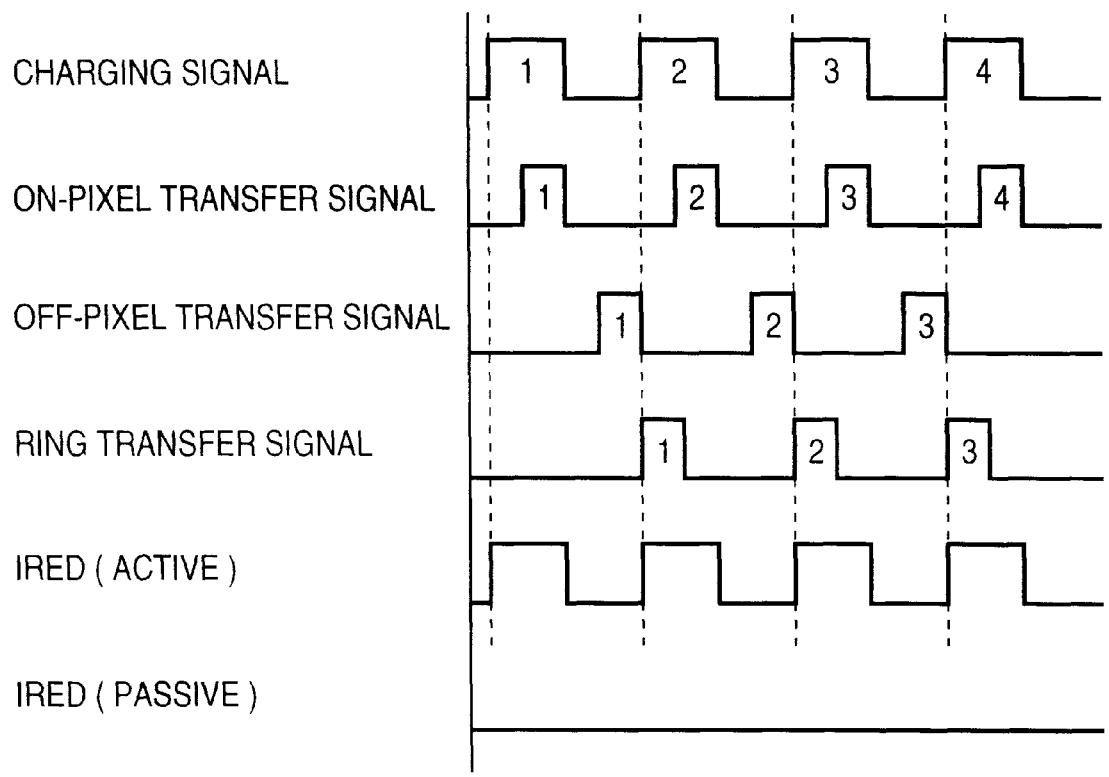
FIG. 13 is a timing chart for explaining charge transference timing in the ring-shaped CCD.
Figure 15:
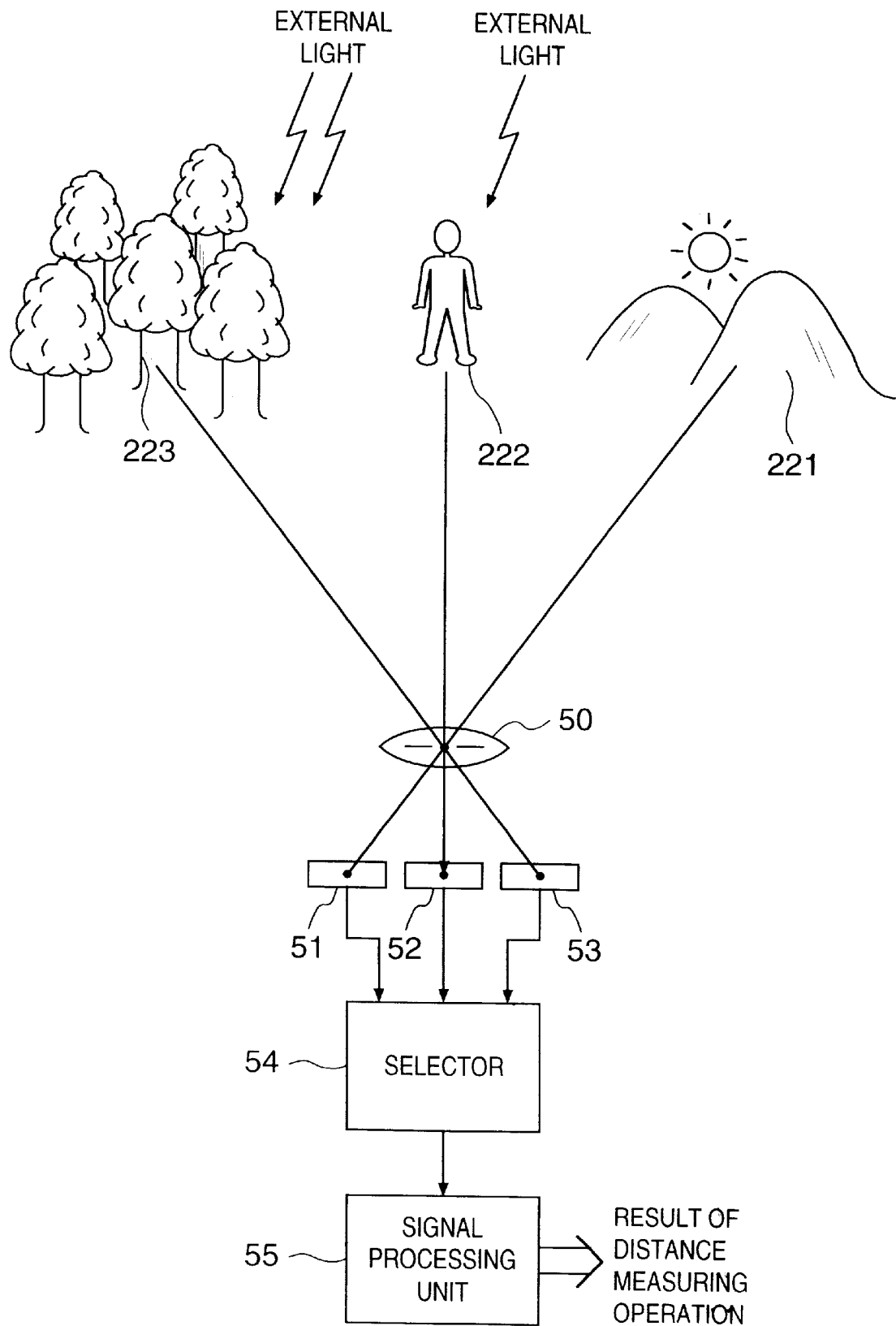
FIG. 15 is a diagram for explaining a conventional distance measuring apparatus.
Figure 16:
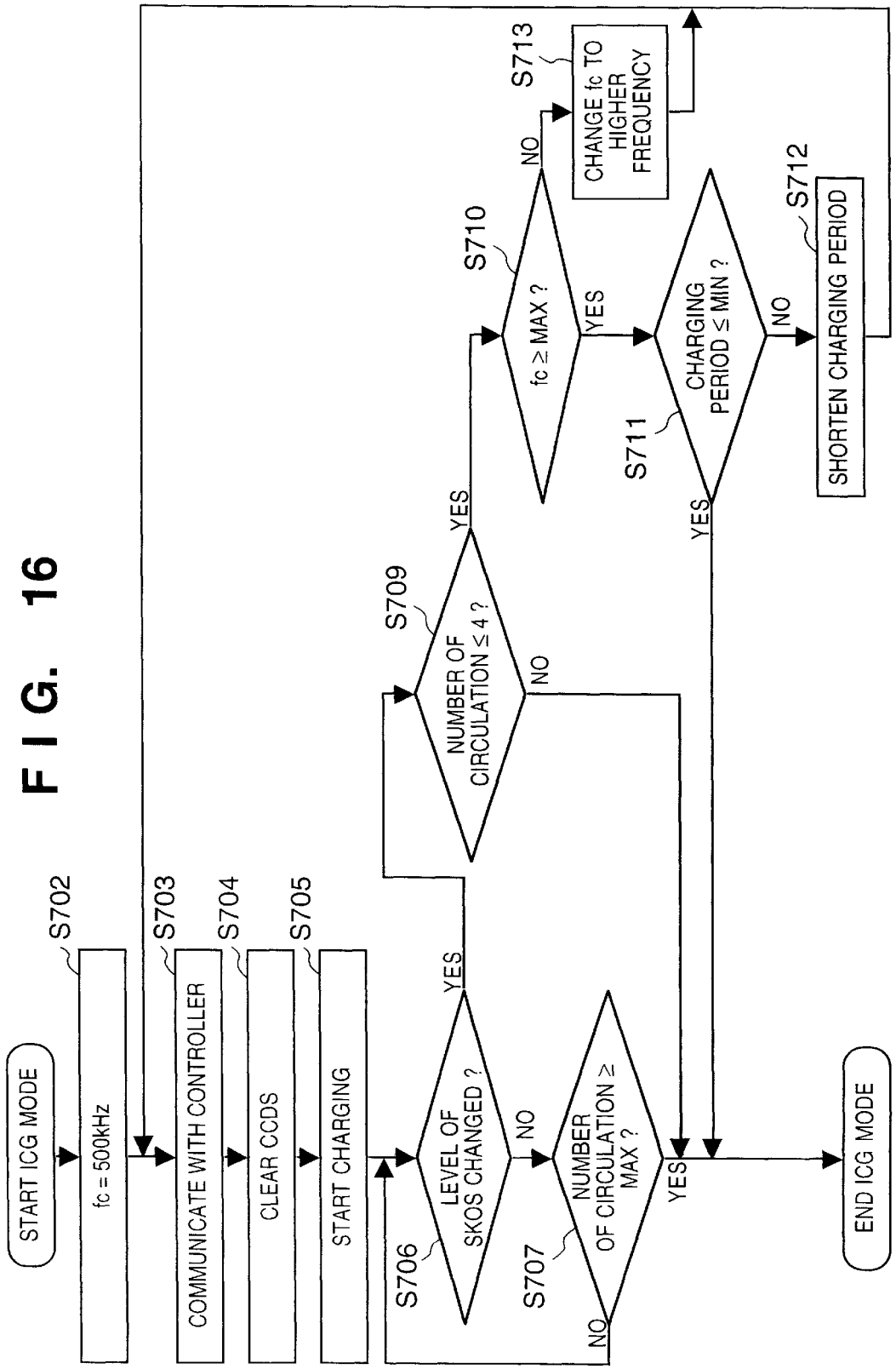
FIG. 16 is a flowchart for explaining processing of an ICG mode when performing conventional distance measuring operation.

Thus, the distance measuring sensor 7109 has two ring-shaped CCDs 8204a and 8204b, as shown in FIG. 8. The ring-shaped CCDs 8204a and 8204b have the same configuration as that of the ring-shaped CCD 521 explained with reference to FIG. 12.

Accordingly, referring to FIG. 8, the distance measuring sensor 7109 receives light, emitted by a light-emitting element 8201, such as a light-emitting diode and infrared light-emitting device, and reflected by the object 8202, or external light reflected by the object 8202, generates charges corresponding to the quantity of the received light, and outputs the charges in response to control by the distance measuring sensor controller 7108 on the basis of a mode (active mode or passive mode). In FIG. 8, an example of the outputs from the ring-shaped CCDs 8204a and 8204b are denoted by 8300a and 8300b, respectively. The outputs 8300a and 8300b are provided to the MPU 7101 via the distance measuring sensor controller 7108, and predetermined operations are performed on the basis of the outputs 8300a and 8300b in the MPU 7101, then a distance to the object 8202 is obtained as a result.

The distance measuring operation performed by the image sensing apparatus 7100 of the third embodiment when executing automatic focusing function which deals with objects ranging from an object of high reflectance at a short distance to an object of low reflectance at a distance using the distance measuring circuit 7114 having the configuration as described above is as the flowchart shown in FIG. 9, for instance.

Figure 9:
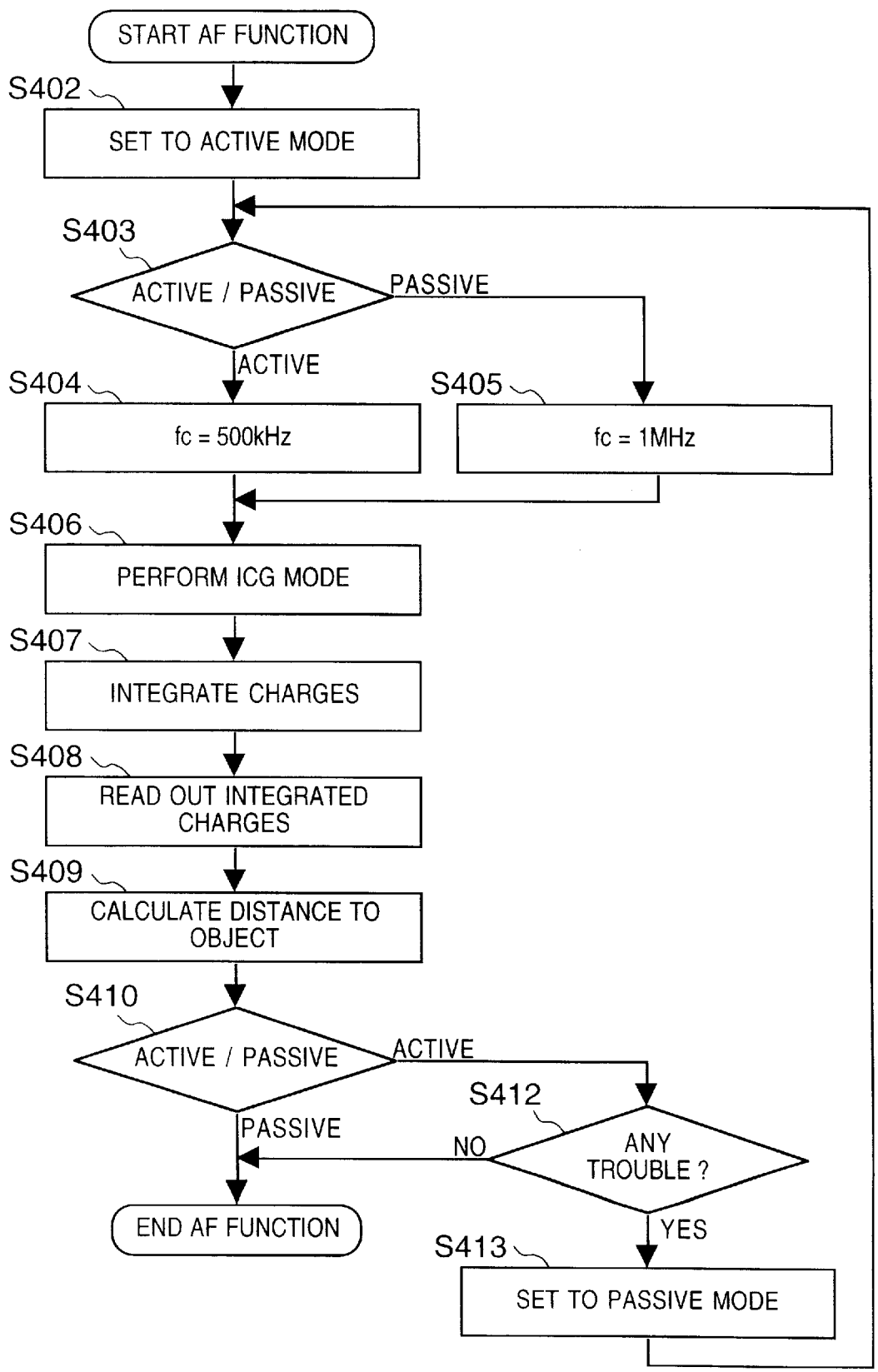
FIG. 9 is a flowchart for explaining a distance measuring operation according to the third embodiment of the present invention.

A program which realizes the operation as shown in FIG. 9 is stored in the memory 101*a* of the MPU 7101, and by down-loading a program stored in the memory 101*a* in advance and executing it by the operation unit 101*b*, the image sensing apparatus 7100 operates as follows.

First, when the automatic focusing (AF) function is activated, the active mode is set in step S402; thereby the distance measuring operation is performed in the active mode.

Next in step S403, whether the current mode is the active mode or the passive mode is determined.

If it is determined that the current mode is the active mode in step S403, then the operation frequency fc for operating the distance measuring sensor 7109 is set to 500 kHz as an initial value in step S404. Whereas, if it is determined that the current mode is the passive mode in step S403, then the operation frequency fc is set to 1 MHz as an initial value in step S405.

After setting the initial operation frequency either in step S404 or S405, ICG (Integration Clear Gate) mode is executed in step S406.

The ICG mode is to determine charging conditions (e.g., setting of electronic shutter and operation frequency) so that any of the OFF-pixels 523*x*, 523*y*, and 523*z* (see FIG. 12) of the distance measuring sensor 7109 is not saturated by external light while accumulating charges.

Then the integration mode is executed in step S407. In the integration mode, charges are integrated in the ring-shaped CCDs 8204*a* and 8204*b* of the distance measuring sensor 7109.

The period elapsed while integrating charges (integration period) is known from the number of circulations and the operation frequency fc stored in advance.

Next, read-out mode is executed in step S408. The read-out mode is to read out charges (image signals) integrated in the ring-shaped CCDs 8204*a* and 8204*b* to the MPU 7101.

Then in step S409, the MPU 7101 performs predetermined operation (distance measuring calculation) based on the image signals outputted from the ring-shaped CCDs 8204*a* and 8204*b*, thereby obtaining the distance to the object 8202. As for an operation method for obtaining the distance to the object 8202, there is a correlation operation, for instance, in which an offset amount where the image signals match best is searched while shifting one of the two image signals, then the distance to the object 8202 is obtained on the basis of the offset amount.

Thereafter, in step S410, whether the current mode (distance measuring mode) is the active mode or the passive mode is checked.

If it is determined that the current mode is the active mode in step S410, then the process proceeds to step S412 where the distance measuring operation has completed normally (OK) or with problem (No Good; NG) is determined. In a case where any trouble has occurred in the distance measuring operation, and the passive mode is set in step S413, the process returns to step S403, and the processes subsequent to step S403 are performed again.

Whereas, it is determined in step S412 that the distance measuring operation has completed normally, then the result of distance measuring operation obtained in step S409 is adopted, and the process is completed.

Whereas, if it is determined in step S410 that the current mode is the passive move, then the result of the distance measuring operation obtained in step S409 is adopted, and the process is completed.

Figure 10:
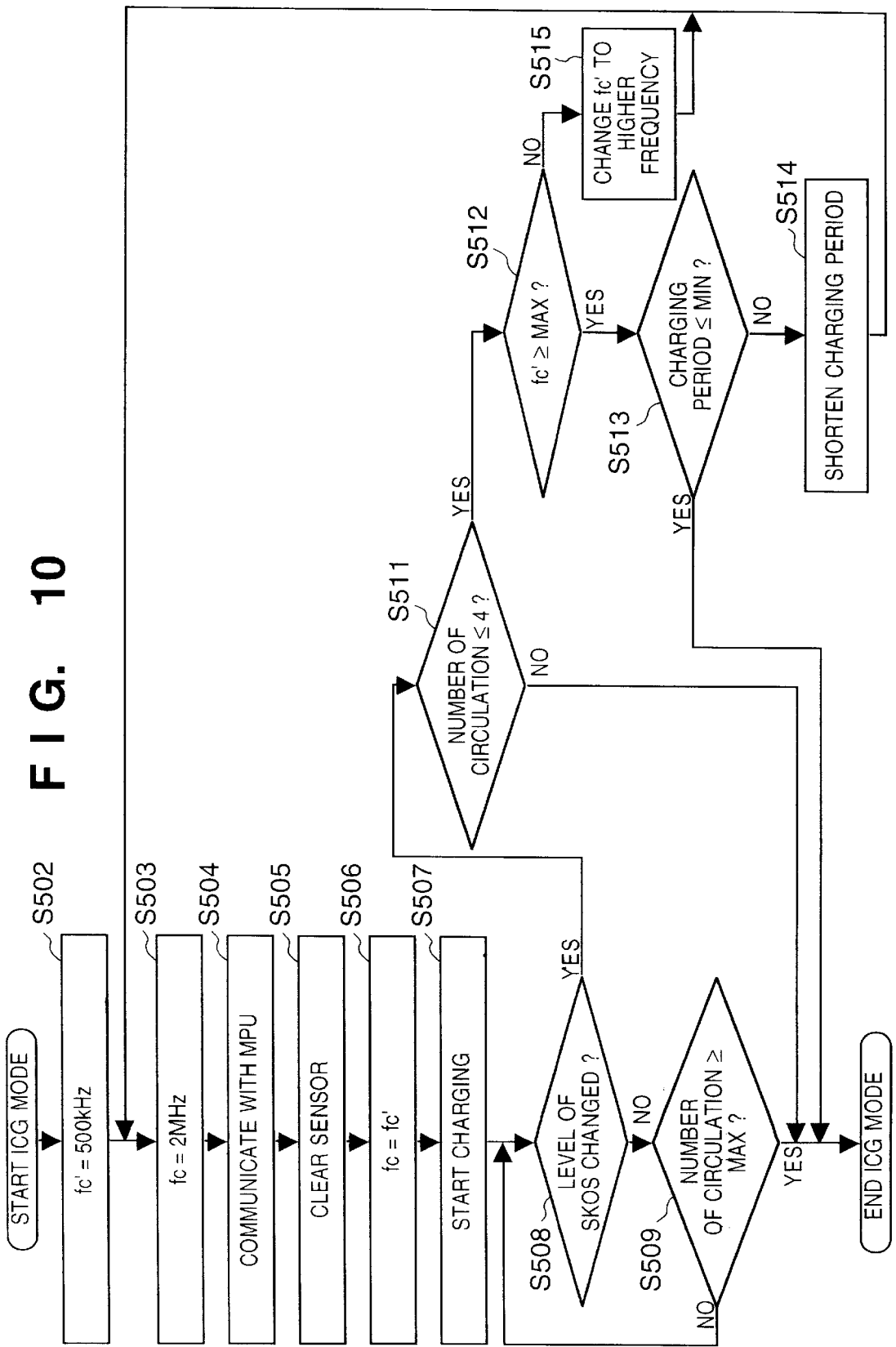
FIG. 10 is a flowchart for explaining processing of ICG mode when performing the distance measuring operation shown in FIG. 9.

In the image sensing apparatus 7100 which performs the distance measuring operation as described above, the feature of the third embodiment of the present invention is that the ICG mode in step S406 is performed as shown in a flowchart of FIG. 10.

A program which realizes the operation as shown in FIG. 10 is stored in the memory 101*a* of the MPU 7101, and by down-loading a program stored in the memory 101*a* in advance and executing it by the operation unit 101*b*, the image sensing apparatus 7100 operates as follows.

First, when the ICG mode is initiated, the operation frequency of the distance measuring sensor 7109, fc', is set to the lowest frequency, namely, 500 kHz in step S502. The operation frequency fc' is used later when accumulating charges in the distance measuring sensor 7109, and stored in the MPU 7101, for instance.

Then in step S503, another operation frequency of the distance measuring sensor 7109, fc, is set to 2 MHz, for instance. The operation frequency fc is used for communicating between the distance measuring unit 7114 and the MPU 7101, and clearing residual charges. Note, the operation frequency fc set in step S503 is not limited to 2 MHz, and any frequency may be set as long as the distance measuring sensor 7109 operates properly.

Next, a charging period is set to an initial value, which is the longest period. Since the charging period and other charging conditions in the distance measuring sensor 7109 can be changed by communicating with the MPU 7101, the MPU 7101 generates communication data indicative of the initial value which makes the charging period longest, and sends the data to the distance measuring unit 7114, thereby the charging period is set to the initial value in step S504.

At this time, the distance measuring sensor 7109 is driven by the operation frequency fc (=2 MHz).

Thereafter, residual charges in the distance measuring sensor 7109 are cleared in step S505. Note, the distance measuring sensor 7109 is also driven at the operation frequency fc (=2 MHz) in this stage.

Next in step S506, the operation frequency fc (=2 MHz) is changed to fc' (=500 kHz) which is set in step S502. Accordingly, the distance measuring sensor 7109 is operated at the operation frequency fc' (=500 kHz) in the subsequent steps of step S506.

In step S507, charging processing is initiated.

At the same time, the distance measuring sensor controller 7108 monitors a signal SKOS outputted from the distance measuring sensor 7109. The signal SKOS has a characteristic of changing its signal level (high and low) when the level of charges integrated in any pixel of the distance measuring sensor 7109 exceeds a predetermined level during integrating charges in the ICG mode. Therefore, by monitoring the time since the charging processing is initiated until the level of the signal SKOS changes, it is possible to know whether or not the current charging conditions are proper.

Next in step S508, whether or not the level of the signal SKOS has changed is checked. If the level has not changed, then the process proceeds to step S509 where whether or not the number of circulations exceeds the maximum number of circulations, which is set in advance, is determined. If it does, then the integration of charge is terminated at that point, and the process is completed. Whereas if it does not, then the process returns to step S503 where the processes of the subsequent steps are performed.

Whereas, if it is determined in step S508 that the level of the signal SKOS has changed, then whether or not the number of the circulations is equal to or less than a predetermined number of circulations (four circulations, in the third embodiment), in other words, whether or not the time elapsed before the level of the signal SKOS has changed is within a predetermined period, is determined in step S511. If the number of circulations exceeds the predetermined number, then the process is completed.

Note that the number of circulations is counted by counting a reference clock IRCLK which will be explained later. Further, the predetermined number of circulations is not limited to four.

Whereas, if it is determined in step S511 that the number of circulations is equal to or less than the predetermined number, then the process proceeds to step S512 where whether the operation frequency fc' is the maximum frequency or not is determined.

If it is determined that the operation frequency f' is the maximum, then in step S513, whether or not the charging period which is currently set is the shortest is determined. If it is determined in step S513 that the charging period is the shortest, then the process is completed. Whereas, if it is not, the charging period is changed to a shorter period in step S514, then the process returns to step S503, and the subsequent steps are repeated. By changing the charging period to a shorter period, the changing condition is changed so that the level of the signal SKOS does not change within the predetermined number of circulations.

Further, if it is determined in step S512 that the operation frequency fc' is not the maximum, the operation frequency fc' is changed to a higher frequency in step S515, then the process returns to step S503 and the subsequent processes are repeated.

After the ICG mode as described above is completed, the charging (integration) mode (step S407 in FIG. 9) is performed, then the read-out mode (step S408 in FIG. 9) is performed.

Figure 11:
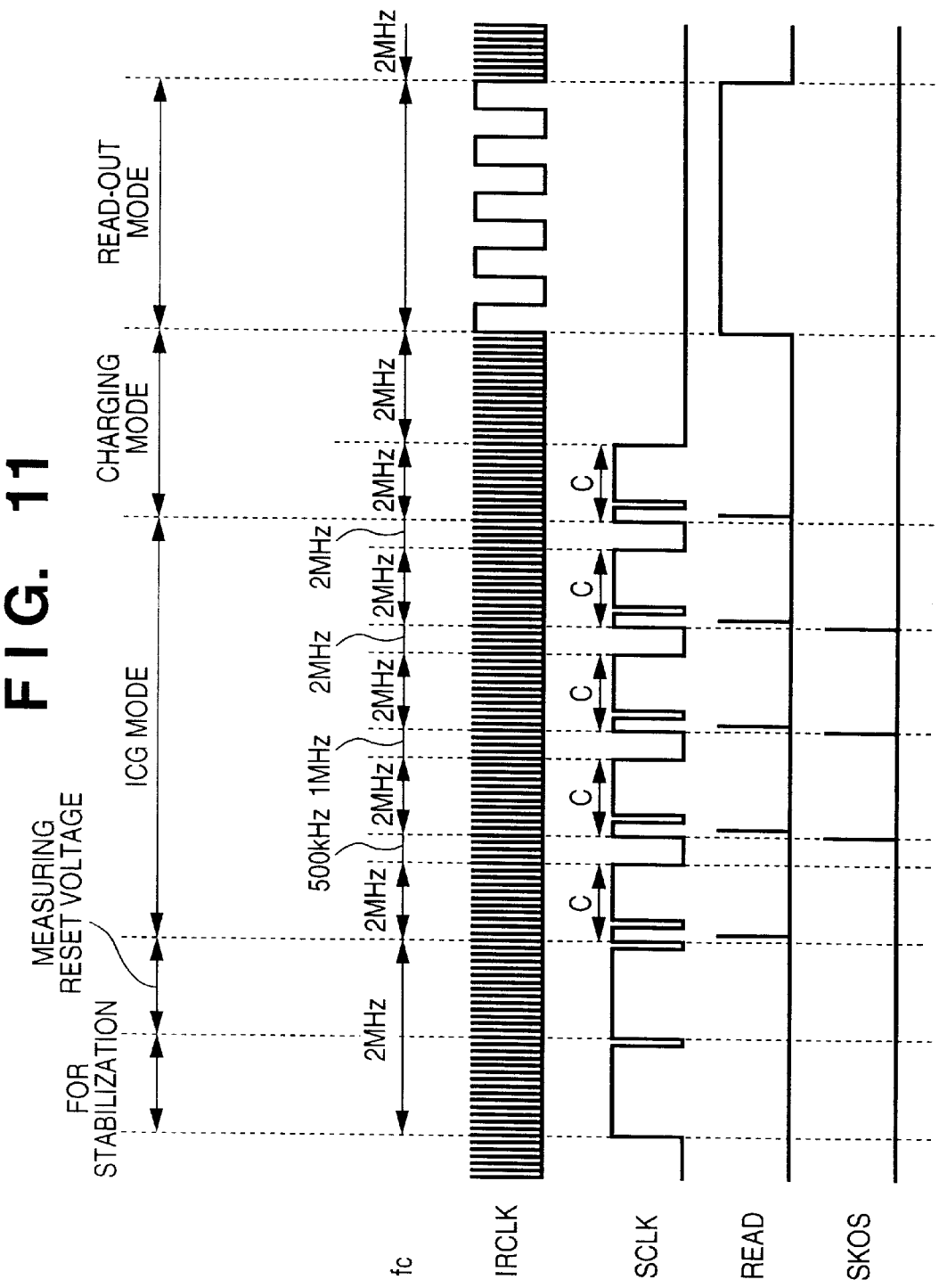
FIG. 11 is a timing chart of driving pulses for the light-receiving unit in an ICG mode.

FIG. 11 shows waveforms of respective signals when the operation frequency fc' is changed from the lowest to the highest, further, the charging period is shortened by a predetermined period, in the ICG mode.

In FIG. 11, the signal IRCLK is a reference clock for changing the charging conditions, and the IRED 7201 turns on and off in synchronization with the signal IRCLK. Further, the signal IRCLK is also used for counting the number of circulations.

Further, the signal SKOS is outputted from the distance measuring sensor 7109, and, as described above, the level of the signal SKOS is changed in accordance with the set charging conditions.

In FIG. 11, hatched portions of the signal SCLK show periods when the distance measuring unit 7114 communicates with the MPU 7101, and when residual charges in the distance measuring sensor 7109 are cleared.

When the ICG mode is initiated, 500 kHz is set as an initial frequency of the operation frequency fc'. A period when the distance measuring sensor 7109 is operated at 500 kHz is indicated in FIG. 11.

While performing communication and clearing the residual charges, the distance measuring sensor 7109 is operated at the operation frequency fc of 2 MHz. Periods when the distance measuring sensor 7109 is operated at 2 MHz are indicated in FIG. 11.

Then, the operation frequency fc is changed to the operation frequency fc' of 500 kHz, and integration of charges is performed. If the level of the signal SKOS has changed within equal to or less than four circulations (i.e., if the level of the signal SKOS has changed before the count of the signal IRCLK reaches five), the operation frequency fc' is changed to a higher frequency (in this case, 1 MHz ), then the ICG mode is repeated. A periods when the distance measuring sensor 7109 is operated at 1 MHz is indicated in FIG. 11.

Then, the ICG mode is performed with the operation frequency fc' of 1 MHz. Similarly to above, while performing communication and clearing the residual charges, the distance measuring sensor 7109 is operated at the operation frequency fc of 2 MHz.

Thereafter, the operation frequency fc is changed to the operation frequency fc' of 1 MHz, and integration of charges is performed. If the level of the signal SKOS has changed before the count of the signal IRCLK reaches five, the operation frequency fc' (1 MHz ) is changed to a higher frequency (2 MHz ), then the ICG mode is repeated.

Thereafter, the ICG mode is performed with the operation frequency fc' of 2 MHz. In this case, the operation frequency fc' is set to the maximum frequency of 2 MHz, communication and clearing the residual charges are performed at the operation frequency fc' of 2 MHz, further, integration of charges is performed at the operation frequency fc' of 2 MHz. If the level of the signal SKOS has changed before the count of the signal IRCLK reaches five, since it is not possible to change the operation frequency fc' to a higher frequency, because 2 MHz is the maximum frequency, the charging period is shortened, and the ICG mode is repeated. Under the above conditions, the level of the signal SKOS does not change when the count of the signal IRCLK reaches four, in the example shown in FIG. 11. Accordingly, the ICG mode is completed, and the process moves to the charging mode.

In the third embodiment as described above, while the distance measuring unit 7114 communicates with the MPU 7101 and while residual charges in the distance measuring sensor 7109 are cleared (in FIG. 11, periods when the signal SCLK is High, namely, hatched periods), independent of the operation frequency fc' (500 kHz→1 MHz→2 MHz ) used for charging operation, the operation frequency fc at which the distance measuring sensor 7109 operates properly, e.g., the maximum frequency of 2 MHz, is used.

Accordingly, time for the distance measuring unit 7114 to communicate with the MPU, for instance, and time for clearing residual charges in the distance measuring sensor 7109 are shortened comparing to the prior art, thereby throughput of the distance measuring operation is shortened.

Note, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. A distance measuring apparatus comprising:
   a light-emitting device for projecting light pulses onto an object for which a distance is to be measured;
   a pair of light-receiving units each having a plurality of photoelectric conversion elements which receive light reflected by the object, generate charges in correspondence with the received light, and output the charges;
   a controller for controlling to perform a distance measuring operation in a first mode and in a second mode time serially;
   a first condition determination unit for determining charging conditions to be used in the first mode in accordance with the charges outputted from said pair of light-receiving units; and
   a second condition determination unit for determining charging conditions to be used in the second mode on the basis of the charging conditions determined by said first condition determination unit.

2. The distance measuring apparatus according to claim 1, wherein, in the first mode, a distance to the object is obtained on the basis of the charges outputted from said pair of light-receiving units while operating said light-emitting device, and in the second mode, a distance to the object is obtained on the basis of the charges outputted from said pair of light-receiving units without operating said light-emitting device.

3. The distance measuring apparatus according to claim 1, wherein, in the first mode, a distance to the object is obtained on the basis of the charges outputted from said pair of light-receiving units without operating said light-emitting device, and in the second mode, a distance to the object is obtained on the basis of the charges outputted from said pair of light-receiving units while operating said light-emitting device.

4. The distance measuring apparatus according to claim 1, wherein said first condition determination unit determines the charging conditions on the basis of a charge having a maximum level out of the charges outputted from said pair of light-receiving units.

5. The distance measuring apparatus according to claim 1, wherein said second condition determination unit determines the charging conditions determined by said first condition determination unit as the charging conditions to be used in the second mode.

6. The distance measuring apparatus according to claim 5, further comprising a pair of integration units for integrating the charge outputted from each of the plurality of photoelectric conversion elements of said pair of light-receiving units in a plurality of number of times,
   wherein the charging conditions include an operation frequency of said integration units.

7. The distance measuring apparatus according to claim 5, further comprising a pair of integration units which take the charge outputted from each of the plurality of photoelectric conversion elements of said pair of light-receiving units through electronic shutters, and integrate the charge in a plurality of number of times,
   wherein the charging conditions include an open period of said electronic shutters.

8. The distance measuring apparatus according to claim 2, further comprising a pair of integration units which integrates the charge outputted from each of the plurality of photoelectric conversion elements of said pair of light-receiving units in a plurality of number of times, and skim a predetermined level, Vskim, of charges, when the integrated charge exceeds a predetermined level, Vjudge,
   wherein the charging conditions include an operation frequency of said integration units, and said second condition determination unit halves an operation frequency determined by said first condition determination unit, if $$(Vlinear-Vjudge)/N \geq (N \times Vskim)/2$$

where Vlinear is a level to which linearity of the distance measuring apparatus is secured and N is the number of times the charge is integrated in said integration units when the integrated charge reaches the predetermined level Vjudge, is satisfied.

9. The distance measuring apparatus according to claim 2, further comprising a pair of integration units which take the charge outputted from each of the plurality of photoelectric conversion elements of said pair of light-receiving units through electronic shutters, integrate the charge in a plurality of number of times, and skim a predetermined level, Vskim, of charges, when the integrated charge exceeds a predetermined level, Vjudge,
   wherein the charging conditions include an open period of said electronic shutters, and said condition determination unit doubles an open period of said electronic shutters determined by said first condition determination unit, if $$(Vlinear-Vjudge)/N \geq (N \times Vskim)/2$$

where Vlinear is a level to which linearity of the distance measuring apparatus is secured and N is the number of times the charge is integrated in said integration units when the integrated charge reaches the predetermined level Vjudge, is satisfied.

10. The distance measuring apparatus according to claim 3, further comprising a pair of integration units which integrates the charge outputted from each of the plurality of photoelectric conversion elements of said pair of light-receiving units in a plurality of number of times, and skim a predetermined level, Vskim, of charges, when the integrated charge exceeds a predetermined level, Vjudge,
   wherein the charging conditions include an operation frequency of said integration units, and said second condition determination unit doubles an operation frequency determined by said first condition determination unit, if $$(Vlinear-Vjudge)/N \geq (N \times Vskim)/2$$

where Vlinear is a level to which linearity of the distance measuring apparatus is secured and N is the number of times the charge is integrated in said integration units when the integrated charge reaches the predetermined level Vjudge, is satisfied.

11. The distance measuring apparatus according to claim 3, further comprising a pair of integration units which take the charge outputted from each of the plurality of photoelectric conversion elements of said pair of light-receiving units through electronic shutters, integrate the charge in a plurality of number of times, and skim a predetermined level, Vskim, of charges, when the integrated charge exceeds a predetermined level, Vjudge, wherein the charging conditions include an open period of said electronic shutters, and said condition determination unit halves an open period of said electronic shutters determined by said first condition determination unit, if $$(Vlinear - Vjudge)/N \geq (N \times Vskim)/2$$

where Vlinear is a level to which linearity of the distance measuring apparatus is secured and N is the number of times the charge is integrated in said integration units when the integrated charge reaches the predetermined level Vjudge, is satisfied.

12. The distance measuring apparatus according to claim 1, wherein the distance measuring apparatus is capable of performing multi-point distance measurement.

13. A control method of controlling a distance measuring apparatus, comprising:
   a light projecting step of projecting light pulses onto an object for which a distance is to be measured;
   a photoelectric conversion step of receiving light reflected by the object, generating charges in correspondence with the received light, and outputting the charges using a pair of light-receiving units each having a plurality of photoelectric conversion elements;
   a first condition determination step of determining charging conditions to be used in a first mode in accordance with the charges outputted in said photoelectric conversion step;
   a second condition determination step of determining charging conditions to be used in a second mode on the basis of the charging conditions determined by said first condition determination step; and
   a control step of controlling to perform a distance measuring operation in the first mode and in the second mode time serially.

14. The control method according to claim 13, wherein, in the first mode, a distance to the object is obtained on the basis of the charges outputted in said photoelectric conversion step while enabling said light projecting step, and in the second mode, a distance to the object is obtained on the basis of the charges outputted from said pair of light-receiving units while disabling said light projecting step.

15. The control method according to claim 13, wherein, in the first mode, a distance to the object is obtained on the basis of the charges outputted from said pair of light-receiving units while disabling said light projecting step, and in the second mode, a distance to the object is obtained on the basis of the charges outputted in said photoelectric conversion step while enabling said light projecting step.

16. The control method according to claim 13, wherein, in said first condition determination step, the charging conditions are determined on the basis of a charge having a maximum level out of the charges outputted in said photoelectric conversion step.

17. The control method according to claim 13, wherein, in said second condition determination step, the charging conditions determined in said first condition determination step are determined as the charging conditions to be used in the second mode.

18. The control method according to claim 17, further comprising an integration step of integrating the charge outputted from each of the plurality of photoelectric conversion elements of said pair of light-receiving units in a plurality of number of times,
   wherein the charging conditions include an operation frequency for said integration step.

19. The control method according to claim 17, further comprising an integration step of taking the charge outputted from each of the plurality of photoelectric conversion elements of said pair of light-receiving units through electronic shutters, and integrating the charge in a plurality of number of times,
   wherein the charging conditions include an open period of said electronic shutters.

20. The control method according to claim 14, further comprising:
   an integration step of integrating the charge outputted from each of the plurality of photoelectric conversion elements of said pair of light-receiving units in a plurality of number of times; and
   a skim step of skimming a predetermined level, Vskim, of charges, when the integrated charge exceeds a predetermined level, Vjudge,
   wherein the charging conditions include an operation frequency for said integration step, and, in said second condition determination step, an operation frequency determined in said first condition determination step is halved, if $$(Vlinear - Vjudge)/N \geq (N \times Vskim)/2$$

where Vlinear is a level to which linearity of the distance measuring apparatus is secured and N is the number of times the charge is integrated in said integration step when the integrated charge reaches the predetermined level Vjudge, is satisfied.

21. The control method according to claim 14, further comprising:
   an integration step of taking the charge outputted from each of the plurality of photoelectric conversion elements of said pair of light-receiving units through electronic shutters, and integrating the charge in a plurality of number of times; and
   a skim step of skimming a predetermined level, Vskim, of charges, when the integrated charge exceeds a predetermined level, Vjudge,
   wherein the charging conditions include an open period of said electronic shutters, and, in said condition determination step, an open period of said electronic shutters determined in said first condition determination step is doubled, if $$(Vlinear - Vjudge)/N \geq (N \times Vskim)/2$$

where Vlinear is a level to which linearity of the distance measuring apparatus is secured and N is the number of times the charge is integrated in said integration step when the integrated charge reaches the predetermined level Vjudge, is satisfied.

22. The control method according to claim 15, further comprising:

an integration step of integrating the charge outputted from each of the plurality of photoelectric conversion elements of said pair of light-receiving units in a plurality of number of times; and a skim step of skimming a predetermined level, Vskim, of charges, when the integrated charge exceeds a predetermined level, Vjudge, wherein the charging conditions include an operation frequency for said integration step, and, in said second condition determination step, an operation frequency determined in said first condition determination step is doubled, if $$(\text{Vlinear}-\text{Vjudge})/N \geq (N \times \text{Vskim})/2$$

where Vlinear is a level to which linearity of the distance measuring apparatus is secured and N is the number of times the charge is integrated in said integration step when the integrated charge reaches the predetermined level Vjudge, is satisfied.

23. The control method according to claim 15, further comprising:

an integration step of taking the charge outputted from each of the plurality of photoelectric conversion elements of said pair of light-receiving units through electronic shutters, and integrating the charge in a plurality of number of times; and a skim step of skimming a predetermined level, Vskim, of charges, when the integrated charge exceeds a predetermined level, Vjudge, wherein the charging conditions include an open period of said electronic shutters, and, in said condition determination step, an open period of said electronic shutters determined in said first condition determination step is halved, if $$(\text{Vlinear}-\text{Vjudge})/N \geq (N \times \text{Vskim})/2$$

where Vlinear is a level to which linearity of the distance measuring apparatus is secured and N is the number of times the charge is integrated in said integration step when the integrated charge reaches the predetermined level Vjudge, is satisfied.

24. The control method according to claim 13, wherein the distance measuring apparatus is capable of performing multi-point distance measurement.

25. A computer program product comprising a computer usable medium having computer readable program code means embodied in said medium for controlling a distance measuring apparatus, said product comprising:

first computer readable program code means of a light projecting step for projecting light pulses onto an object for which a distance is to be measured;

second computer readable program code means of a photoelectric conversion step for receiving light reflected by the object, generating charges in correspondence with the received light, and outputting the charges using a pair of light-receiving units each having a plurality of photoelectric conversion elements;

third computer readable program code means of a first condition determination step for determining charging conditions to be used in a first mode in accordance with the charges outputted in said photoelectric conversion step;

fourth computer readable program code means of a second condition determination step for determining charging conditions to be used in a second mode on the basis of the charging conditions determined in said first condition determination step; and fifth computer readable program code means of a control step for controlling to perform a distance measuring operation in the first mode and in the second mode time serially.

26. An optical device used for measuring a distance to an object, comprising:

a light-emitting device for projecting light pulses onto an object for which a distance is to be measured;

a pair of light-receiving units each having a plurality of photoelectric conversion elements which receive light reflected by the object, generates charges in correspondence with the received light, and output the charges;

a pair of charge accumulation units for accumulating charges outputted from the respective photoelectric conversion elements of said pair of light-receiving units; and an operation frequency controller for independently controlling a first operation frequency used in a first period when charges are accumulated in said charge accumulation units and a second operation frequency used in a second period other than the first period.

27. The optical device according to claim 26, wherein said first period includes a period of accumulating charges in said charge accumulation units for determining charging conditions.

28. The optical device according to claim 27, wherein the charging conditions include a length of a period of accumulating charges in said charge accumulation units.

29. The optical device according to claim 27, wherein the charging conditions include the first operation frequency.

30. The optical device according to claim 26, wherein the second period includes a period of clearing charges in said charge accumulation units.

31. The optical device according to claim 26, wherein the second period includes a period of communicating with an external device.

32. The optical device according to claim 26, further comprising a pair of integration units for respectively integrating the charges accumulated in said charge accumulation units in a plurality of number of times.

33. A control method of controlling an optical device used for measuring a distance to an object, said method comprising:

a light projecting step of projecting light pulses onto an object for which a distance is to be measured;

a photoelectric conversion step of receiving light reflected by the object, generating charges in correspondence with the received light, and outputting the charges using a pair of light-receiving units each having a plurality of photoelectric conversion elements;

a charge accumulation step of accumulating the charges in said photoelectric conversion step;

a first determination step of determining a first operation frequency used in a first period when charges are accumulated in said charge accumulation units; and a second determination step of determining a second operation frequency used in a second period other than the first period.

34. The control method according to claim 33, wherein said first period includes a period of accumulating charges in said charge accumulation step for determining charging conditions.

35. The control method according to claim 34, wherein the charging conditions include a length of a period of accumulating charges in said charge accumulation step.

36. The control method according to claim 34, wherein the charging conditions include the first operation frequency.

37. The control method according to claim 33, wherein the second period includes a period of clearing charges before accumulating charges in said charge accumulation step.

38. The control method according to claim 33, wherein the second period includes a period of communicating with an external device.

39. The control method according to claim 33, further comprising an integration step of respectively integrating the charges accumulated in said charge accumulation step in a plurality of number of times.

40. A computer program product comprising a computer usable medium having computer readable program code means embodied in said medium for controlling an optical device used for measuring a distance to an object, said product comprising:

first computer readable program code means of a light projecting step for projecting light pulses onto an object for which a distance is to be measured;

second computer readable program code means of a photoelectric conversion step for receiving light reflected by the object, generating charges in correspondence with the received light, and outputting the charges using a pair of light-receiving units each having a plurality of photoelectric conversion elements;

third computer readable program code means of a charge accumulation step for accumulating the charges in said photoelectric conversion step;

fourth computer readable program code means of a first determination step for determining a first operation frequency used in a first period when charges are accumulated in said charge accumulation units; and fifth computer readable program code means of a second determination step for determining a second operation frequency used in a second period other than the first period.

41. A distance measuring apparatus comprising:

light-emitting means for projecting light pulses onto an object for which a distance is to be measured;

photoelectric conversion means having a plurality of photoelectric conversion elements which receive light reflected by the object;

charging period determination means for arbitrary determining a charging period of signal charges to be outputted from said photoelectric conversion means;

charge providing means for transferring the signal charges, accumulated in said photoelectric conversion means during the charging period determined by said charging period determination means, in accordance with predetermined transfer pulses;

charge transfer channel means configured with a plurality of charge transfer channel units, arranged in a ring shape, for transferring the signal charges in a predetermined direction;

transfer electrode means including a group of transfer electrodes provided on said charge transfer channel means via gate oxide;

floating gate electrode means for detecting amounts of the signal charges transferred by said charge transfer channel means, which is provided via gate oxide;

signal charge input means for inputting the signal charges from said floating gate electrode means and said charge providing means to said charge transfer channel means;

circulating-type shift register means for circulating the signal charges inputted by said signal charge input means in accordance with charge transfer pulses applied on transfer electrodes by said charge transfer channel means and integrating the signal charges;

judging means for judging a state of the signal charges integrated by said circulating-type shift register means; and clock generation means for generating a clock signal for operating the distance measuring apparatus on the basis of a judgment by said judging means, wherein said clock generation means changes frequency of the clock signal when accumulation and integration of charges are not performed.

42. A distance measuring apparatus comprising:

a light-receiving unit, having a plurality of photoelectric conversion elements which receive light reflected by an object, generating charges in correspondence with the received light, and output signals; and a controller for controlling said apparatus to perform a distance measuring operation in a first mode and in a second mode time serially, wherein said controller determines charging conditions to be used in the first mode in accordance with the signals outputted from said light-receiving unit and controls charging conditions to be used in the second mode on the basis of the charging conditions of said first mode.

43. A distance measuring apparatus comprising:

a light-receiving unit, having a plurality of photoelectric conversion elements which receive light reflected by an object, generating charges in correspondence with the received light, and output signals; and a controller for controlling said apparatus to perform a distance measuring operation in a first mode and in a second mode time serially, wherein said controller determines charging conditions to be used in the first mode in accordance with the signals outputted from said light-receiving unit and controls the second mode on the basis of the charging conditions of said first mode.

* * * * *

UNITED STATES PATENT AND TRADEMARK OFFICE
CERTIFICATE OF CORRECTION

PATENT NO. : 6,160,613
DATED : December 12, 2000
INVENTOR(S) : Takasake, et al.

It is certified that error appears in the above-identified patent and that said Letters Patent is hereby corrected as shown below:

Title page,
Insert the following:

-- "[*] Notice: This patent issued on continued prosecution application filed under 37 CFR 1.53(d), and is subject to the twenty year patent term provisions of 35 U.S.C. 154 (a) (2). --

Column 10,
Line 61, "censors" should read -- sensors --.

Column 13,
Line 23, "a" should read -- $\alpha$ --.

Column 26,
Line 14, "generates" should read -- generate --.

Column 27,
Line 49, "arbitrary" should read -- arbitrarily --.

Signed and Sealed this

Twenty-third Day of October, 2001

Attest:

NICHOLAS P. GODICI
Attesting Officer      Acting Director of the United States Patent and Trademark Office